United States Patent
Enomura

(10) Patent No.: US 11,628,412 B2
(45) Date of Patent: Apr. 18, 2023

(54) STIRRER

(71) Applicant: M. TECHNIQUE CO., LTD., Izumi (JP)

(72) Inventor: Masakazu Enomura, Izumi (JP)

(73) Assignee: M. TECHNIQUE CO., LTD., Izumi (JP)

(*) Notice: Subject to any disclaimer, the term of this patent is extended or adjusted under 35 U.S.C. 154(b) by 0 days.

(21) Appl. No.: 17/255,646

(22) PCT Filed: Apr. 15, 2019

(86) PCT No.: PCT/JP2019/016233
§ 371 (c)(1),
(2) Date: Dec. 23, 2020

(87) PCT Pub. No.: WO2020/213048
PCT Pub. Date: Oct. 22, 2020

(65) Prior Publication Data
US 2021/0283560 A1 Sep. 16, 2021

(51) Int. Cl.
*B22C 5/00* (2006.01)
*B01F 25/45* (2022.01)
(Continued)

(52) U.S. Cl.
CPC .......... *B01F 25/45* (2022.01); *B01F 25/4523* (2022.01); *B01F 27/8111* (2022.01);
(Continued)

(58) Field of Classification Search
CPC .............. B01F 25/45; B01F 2215/0422; B01F 2215/0431; B01F 23/41; B01F 25/4523;
(Continued)

(56) References Cited

U.S. PATENT DOCUMENTS

| 3,948,492 A | 4/1976 | Debourge et al. |
| 2015/0321154 A1 | 11/2015 | Enomura |

FOREIGN PATENT DOCUMENTS

| EP | 2 870 996 A1 | 5/2015 |
| EP | 3 275 534 A1 | 1/2018 |

(Continued)

OTHER PUBLICATIONS

Google machine translation for "WO-2016152895-A1" (Year: 2016).*
(Continued)

*Primary Examiner* — Anshu Bhatia
*Assistant Examiner* — Gregory Y Huan
(74) *Attorney, Agent, or Firm* — Birch, Stewart, Kolasch & Birch, LLP

(57) ABSTRACT

A stirrer is provided that can more efficiently achieve shearing applied, by an action of an intermittent jet flow, to a fluid to be processed. The stirrer concentrically includes a rotor including a blade, a partition wall, and a screen, wherein: the screen includes a plurality of slits in a circumferential direction thereof and screen members located between the adjacent slit; by rotating at least the rotor of the two components, the fluid to be processed is discharged from the inside to the outside of the screen as the intermittent jet flow through the slit of the screen; the screen has a cylindrical shape having a circular cross section; an opening of the slit provided on the inner wall surface of the screen is used as an inflow opening; openings of the plurality of slits provided on the outer wall surface of the screen are used as outflow openings; and the width of the outflow openings in the circumferential direction is set to be smaller than the width of the inflow opening in the circumferential direction.

20 Claims, 10 Drawing Sheets

(51) Int. Cl.
 *B01F 25/452* (2022.01)
 *B01F 27/91* (2022.01)
 *B01F 27/92* (2022.01)
 *B01F 27/81* (2022.01)
 *B01F 27/921* (2022.01)

(52) U.S. Cl.
 CPC ............ *B01F 27/91* (2022.01); *B01F 27/911* (2022.01); *B01F 27/92* (2022.01); *B01F 27/9213* (2022.01); *B01F 27/9214* (2022.01); *B01F 2215/0422* (2013.01); *B01F 2215/0431* (2013.01)

(58) Field of Classification Search
 CPC ...... B01F 27/40; B01F 27/8111; B01F 27/84; B01F 27/91; B01F 27/911; B01F 27/92; B01F 27/9213; B01F 27/9214
 See application file for complete search history.

(56) References Cited

FOREIGN PATENT DOCUMENTS

| | | | |
|---|---|---|---|
| FR | 2 679 789 | A1 | 2/1993 |
| JP | H01164795 | U * | 11/1989 |
| JP | 4-114725 | A | 4/1992 |
| JP | 5-7757 | A | 1/1993 |
| JP | 5-15937 | Y2 | 4/1993 |
| JP | 7-96167 | A | 4/1995 |
| JP | 2813673 | B2 * | 10/1998 |
| JP | 3123556 | B2 | 1/2001 |
| JP | 5147091 | B1 | 2/2013 |
| JP | 2015-85290 | A | 5/2015 |
| JP | 2015-93209 | A | 5/2015 |
| JP | 6351160 | B2 * | 7/2018 |
| WO | WO2001014049 | A1 * | 3/2001 |
| WO | WO 2014/010094 | A1 | 1/2014 |
| WO | WO 2016/152895 | A1 | 9/2016 |
| WO | WO-2016152895 | A1 * | 9/2016 ............ B01F 3/0807 |

OTHER PUBLICATIONS

STIC machine translation for "JP-H01164795-U" (Year: 1989).*
Google machine translation for "JP-2813673-B2" (Year: 1998).*
Google machine translation for JP-6351160-B2 (Year: 2018).*
Google machine translation for "WO2001014049A1" (Year: 2001).*
International Search Report (PCT/ISA/210) issued in PCT/JP2019/016233 dated Jul. 9, 2019.
Extended European Search Report for corresponding European Application No. 19925214.9, dated Nov. 17, 2022.

* cited by examiner (A)

(B)

(A)

(B)

(A)

(B)

(C)

(D)

STIRRER

TECHNICAL FIELD

The present invention relates to improvement of a stirrer, especially a stirrer to be used for emulsification, dispersion, or mixing of a fluid to be processed.

BACKGROUND ART

Various stirrers have been proposed as an apparatus to carry out processing of emulsification, dispersion, or mixing of a fluid, however, today, it is required that the stirrer can satisfactorily process a fluid to be processed containing a substance having a small particle diameter such as nanoparticle.

For example, a bead mill and a homogenizer are known as a kind of widely known stirrer, emulsifier, and disperser.

There is a problem in the bead mill, however, that a crystal state in surface of particle is destructed and damaged thereby decreasing in a performance thereof. In addition, there is a big problem of generation of foreign materials as well as a high-cost problem of the beads which are frequently replaced or fed.

In a high-pressure homogenizer, problems such as unstable operation of the machine as well as a large power requirement have not been solved yet.

A rotary-type homogenizer has been conventionally used as a preliminary mixer; but, in order to carry out nano-dispersion or nano-emulsification, a finishing machine is required to further finish the particles to a nanometer size.

With Regard to Patent Documents

In light of these circumstances, the inventor of the present application has proposed the stirrer described in Patent Documents 1 to 4. This stirrer provides a rotor having a plurality of blades and a screen being arranged around the rotor and having a plurality of slits. By rotating the rotor and screen relative to each other, the fluid to be processed is sheared in a minute space between inner wall of the screen including slits and blades, and the fluid to be processed is discharged from inside the screen to outside as an intermittent jet flow through the slits.

In the stirrer described in Patent Documents 1 to 3, as described in "Conventional Technology" in Patent Document 2, the stirring condition thereof was changed by adjusting rotation number of an impeller (namely rotor). The invention according to Patent Document 2 proposes the stirrer in which a width of clearance between a blade tip of the rotor and the inner wall of the screen could be arbitrarily chosen; by so doing, it was intended to improve and optimize the ability according to a fluid. In Patent Document 3, it was found that the effect of atomization is rapidly increased by increasing the frequency Z (kHz) of the intermittent jet flow more than certain values; and based on this finding, it has been proposed to provide a stirrer capable of forming microparticle in a region where could not be achieved by a conventional stirrer.

In any of Patent Documents 1 to 3, width of the blade tip of the rotor in a circumferential direction and width of the slit provided on the screen in the circumferential direction are under certain constant condition (specifically, under the condition in which the both widths are almost identical, or the width of the blade tip of the rotor is fixed in the state of slightly larger than the width of the slits), the invention was attained by changing the clearance to the inner wall of the screen or changing the frequency Z (kHz) of the intermittent jet flow.

Through the development by the applicant of the present invention up to date, it has been known that process of emulsification, dispersion, or mixing is performed by generation of liquid-liquid shear force in speed interface due to the intermittent jet flow and, it is presumed that this liquid-liquid shear force works effectively to realize miniaturization of fluid to be processed, especially, extremely fine dispersion or emulsification such as nano-dispersion or nano-emulsification; but at present, the action thereof has not been fully clarified yet.

Outline of Development of the Present Invention

The inventor of the present invention has attempted to realize further fine dispersion or emulsification by facilitating miniaturization of a fluid to be processed by using the apparatus described in Patent Documents 1 to 3; however, from the point that the fluid to be processed is sheared in the minute space between the inner wall of the screen including slits and the blades, since it is considered that it is effective to increase the number of shearing per unit times to improve the efficiency of shearing, thus, the study was carried out from a viewpoint how to increase the number of the shearing per unit time.

As a means for achieving this, it is known to change the rotation number of the rotor (rotational peripheral velocity of the tip of the blade) as described in these Patent Documents. Under the condition that the rotation number of the rotor (rotational peripheral velocity of the tip of the blade) is constant, it is considered that either of increasing the number of the slit by narrowing the width of the slit, increasing the number of the blade of the rotor or both is effective.

However, in the case of generating the intermittent jet flow, when the width of the slit is made too wide, a pressure of the fluid to be processed passing through the slit decreases whereby the flow velocity of the intermittent jet flow becomes slower; on the other hand, when the width of the slit is made narrow, flow velocity of the intermittent jet flow becomes faster. However, when the width of the slit is made too narrow, pressure loss increases and a flow amount of the fluid to be processed passing thorough the slit decreases, so that the intermittent jet flow cannot be satisfactorily generated. As the result, there has been a limitation to increase the number of the slit by narrowing the width of the slit.

In addition, when the number of the slit is increased by narrowing the width of the slit, cavitation is significantly generated, and cavitation phenomenon is induced. The cavitation takes process of initial generation, growth, and bubble collapse due to increase of a pressure. When the bubbles collapse, erosion occurs with energy of several thousand atmospheric pressure. This erosion is a major cause of machine damage, and the suppression of cavitation is a very important factor.

Unfortunately, with the current flow analysis simulation technology, it is impossible to carry out accurate cavitation analysis.

In addition, processing ability of the stirrer can be improved by further increasing the rotation number of the rotor. By increasing the rotation number of the rotor, the discharge flow velocity of the fluid to be processed discharged from the inside of the screen to outside through the silt is increased thereby increasing the speed of the intermittent jet flow. In this case, the following points become problem. The speed of sound is about 340 m/second in air at room temperature and about 1500 m/second in water; and when bubbles are mixed due to the cavitation, the speed of sound in water is significantly decreased.

The speed of sound in water including bubbles with void ratio of 0.2 is 30 m/second or less; and the speed of sound in water with void ratio of 0.4 is about 20 m/second. In Patent Documents 1 to 3, it is considered that the speed of the intermittent jet flow passing through the screen is close to the speed of sound in water including the bubbles as mentioned above; and thus, when the speed of the intermittent jet flow exceeds the speed of sound, shock wave is generated to cause a damage to machine. Therefore, it is necessary to suppress the generation of the bubbles due to the cavitation as much as possible to solve the problem of the shock wave.

Accordingly, not only increasing the number of shearing per a unit time, but also focusing on the liquid-liquid shear force due to the intermittent jet flow; and then, by improving the shear force, it is studied to promote the miniaturization of the fluid to be processed and to suppress the generation of the cavitation.

A generation mechanism of the liquid-liquid shear force due to the intermittent jet flow will be explained with referring to FIG. 7. When a blade 12 rotationally moves by rotation of a rotor, a pressure of the fluid to be processed increases in the front side of the blade 12 in a rotation direction. Because of this, the fluid to be processed is discharged as the intermittent jet flow from a slit 18 located in the front side of the blade 12. As a result, the liquid-liquid shear force is generated between the fluid to be processed outside a screen 9 and the fluid to be processed being discharged as the intermittent jet flow. In addition, since the jet flow is intermittent, entrained flow is less likely to occur and which is more effective. Therefore, by increasing the flow velocity of the intermittent jet flow to be discharged, the liquid-liquid shear force can be enhanced; but there is a mechanical limitation in increasing the rotation number of the rotor.

In addition, on the rear surface side of the blade 12 in the rotation direction, due to the decrease in the pressure of the fluid to be processed, a phenomenon occurs in which the fluid to be processed is sucked from the slit 18 located in the rear surface side. As a result, on the outside of the screen 9, the intermittent jet flow of the fluid to be processed from the slit 18 is not discharged relative to the fluid to be processed that is simply stand still, but the forward and reverse flows (discharge and suction) are generated; and thus, it is considered that due to the relative velocity difference in the interface of the both flows, the liquid-liquid shear force is generated between the unsteady fluids to be processed, as such, a water hammering action is generated because the forward and the reverse flow (discharged and suction) are not steady flows but unsteady flows. Due to the effect of this water hammering action, a collision pressure is dramatically increased as compared with the steady flow, so that a further greater shear force is generated thereby increasing processing ability.

In Patent Document 4, on the basis of these points, focusing on the liquid-liquid shear force due to the intermittent jet flow, by defining the relationship between the width of blade tip of the rotor and the width of the slit of the screen, to increase the efficiency of the intermittent jet flow was attempted.

The mixing stirrer and the disperser proposed by Patent Documents 5 to 7, the function and composition thereof are different from those of the present invention in, so that the intermittent jet flow cannot be generated.

PRIOR ART DOCUMENTS

Patent Document

Patent Document 1: Japanese Patent No. 2813673
Patent Document 2: Japanese Patent No. 3123556
Patent Document 3: Japanese Patent No. 5147091
Patent Document 4: International Patent Laid-Open Publication No. 2016/152895
Patent Document 5: Re-publication of PCT International Publication No. 2015-093209
Patent Document 6: Japanese Examined Utility Model Application Publication No. H05-15937
Patent Document 7: French Patent Laid-Open Publication No. 2679789

DISCLOSURE OF INVENTION

Problems to be Solved by the Invention

An object of the present invention is to provide a stirrer which can more efficiently perform shearing applied to a fluid to be processed by an action of an intermittent jet flow.

In addition, another object of the present invention is to provide a stirrer which can realize, as a result of efficient shearing, extremely fine dispersion and emulsification such as nano-dispersion and nano-emulsification.

Means for Solving the Problems

The present invention was achieved as a result of an attempt to improve the stirrer from a novel point of view to increase a relative velocity difference at an interface between forward flow and reverse flow (discharge and suction from a slit) of fluid to be processed caused by an intermittent jet flow. Specifically, by reviewing a cross-sectional shape of the slit provided in a screen, it could be realized to provide a stirrer capable of increasing relative velocity difference between the forward flow and the reverse flow of the fluid to be processed. Further, the inventor of the present invention reviewed the cross-sectional shape of the slit provided in the screen; and as a result, it was found that the relative velocity difference between the forward flow and the reverse flow of the fluid to be processed is increased while reducing a pressure loss of the fluid to be processed, thereby suppressing the cavitation, and the fluid to be processed which is discharged from the inside to the outside of the screen through the silt efficiently forms the intermittent jet flow, thus the present invention was completed on the basis of these findings.

Therefore, the present invention is to improve a stirrer which comprises a rotor having a plurality of blades and rotating as well as a screen laid around the rotor, all of which are provided concentrically, the screen includes a plurality of slits in a circumferential direction thereof and a screen member located between the adjacent slits, and by rotating at least the rotor of the rotor and the screen, a fluid to be processed is discharged as an intermittent jet flow from the inside to the outside the screen through the slits.

In the stirrer according to the present invention, the stirrer comprises the rotor having the plurality of blades and rotating, a partition wall for holding a discharge pressure of the rotor, and the screen laid around the rotor, all of which are provided concentrically, the screen forms a cylindrical shape with a circular cross-section, an opening of the plurality of slits provided on an inner wall surface of the screen is made to serve as an inflow opening, an opening of the plurality of slits provided an outer wall surface of the screen is made to serve as an outflow opening, and a width (So) of the outflow opening in the circumferential direction is set to be narrower than a width (Si) of the inflow opening in the circumferential direction.

In the stirrer according to the present invention, an embodiment can be carried out in which the plurality of the slits in the screen are defined by a front-side end surface and a back-side end surface that are arranged with a distance in the rotation direction of the plurality of blades, and at least an area of the front-side end surface on an inflow side into the slit is inclined forward in the rotation direction of the plurality of blades. The forward inclination means that the front-side end surface is inclined so as to advance forward in the rotation direction of the plurality of blades as the front-side end surface is heading from the inside to the outside of the screen.

Another embodiment of the present invention can be carried out in which an angle of at least an area of the front-side end surface on the inflow side into the slit is in a range of 1 to 45 degrees with respect to a radius passing through a center of the outflow opening in the circumferential direction.

Although not all of the actions of the present invention have been necessarily clarified, the actions of the present invention considered by the inventor of the present invention will be explained in more detail with referring to FIG. 6 and FIG. 7.

The flow of the fluid to be processed on the font side in the rotation direction of the blade 12 will be explained.

In a conventional example shown in FIG. 7(A) and FIG. 7(B) and a conventional example illustrated FIG. 7(C) and FIG. 7(D), the blade 12 rotationally moves due to rotation of the rotor 2, but when the front side of the blade 12 in the rotation direction approaches an inflow opening 28 of the slit 18 in the screen 9, the flow of the fluid to be processed that flows along an inner wall surface of a slit member 19 of the screen 9 becomes a flow that flows along a front-side end surface 22 that defines the slit 18; and thus, the flow of the fluid to be processed suddenly bends. In this case, due to an edge 24 of the inflow opening composed of the inner wall surface of the slit member 19 of the screen 9 and the front-side end surface 22, a pressure of the fluid to be processed dramatically drops and thus, the cavitation occurs. In the conventional slit 18, width (Si) of the inflow opening in the circumferential direction formed in the inner wall surface of the screen 9 is equal to width (So) of the outflow opening in the circumferential direction formed in the outer wall surface of the screen 9; and thus, the edge 24 of the inflow opening becomes an edge substantially right angle (α) which causes significant cavitation and generates a large number of bubbles.

Therefore, in the case of the conventional slit, the width of circumferential direction of the slit in the screen could not make extremely narrow.

In the stirrer of the present invention shown in FIG. 6(A) and FIG. 6(B), since the width (So) of an outflow opening 29 in the circumferential direction provided on the outer wall surface of the screen 9 is narrower than the width (Si) of the inflow opening 28 in the circumferential direction provided on the inner wall surface of the screen 9, a flow velocity of the intermittent jet flow passing through the screen 9 is accelerated due to a nozzle effect.

The plurality of the slits 18 of the screen 9 is defined by the front-side end surface 22 and a back-side end surface 25 arranged at distance in the rotation direction of the plurality of the blades 12; and since at least the area 23 on the inflow side of the slit 18 in the front-side end surface 22 is inclined forward in the rotation direction of the plurality of the blades 12, the edge 24 of the inflow opening becomes an edge of obtuse angle (β), thus extreme pressure drop at the edge 24 of the inflow opening is reduced, and the fluid to be processed is effectively converted into the jet stream. Further, as a matter of course, the pressure loss of the fluid to be processed is reduced and the generation of the cavitation is suppressed, thus generation of bubbles is also suppressed. As a result, a velocity of the intermittent jet flow discharged from the inside to the outside of the screen 9 thorough the slit 18 is increased, thereby increasing a relative speed difference at the interface between the forward flow and the reverse flow (discharge and suction) of the fluid to be processed; and thus, a shear force generated between these the fluid to be processed can be increased.

It is difficult to directly measure the flow velocity of the fluid to be processed; however, as shown in Examples described later, it was confirmed that the stirrer according to the embodiments of the present invention can eminently facilitate miniaturization of the fluid to be processed as compared with conventional stirrers.

In the present invention, the widths of the slit in the circumferential direction can be changed on the condition that the intermittent jet flow can be generated, though the width (So) of the outflow opening in the circumferential direction is preferably in the range of 0.2 to 4.0 mm, and more preferably in the range of 0.5 to 3.0 mm. Further, it is preferable to be carried out that the width of the slit in the circumferential direction be gradually narrowed from the inflow opening toward the outflow opening.

It is preferable that the screen be carried out so that the diameters of the blade and of the screen become smaller as they move away from an introduction part into which the fluid to be processed in an axis direction.

Considering the relationship between the slit and the introduction part in an axial direction, there is a tendency that a discharge amount from the slit nearer the introduction part is larger, on the other hand, the discharge amount from the slit further from an opening for the introduction is smaller. Therefore, the discharge amount in an axial direction of the screen can be made uniform by configuring such that the diameters of the blade and the screen are made smaller as they move apart from the introduction part in an axial direction. By so doing, generation of the cavitation can be suppressed; and thus, malfunction of the machine can be reduced.

The plurality of the slits has the same width in the circumferential direction and are formed at equal intervals in the circumferential direction, whereby the fluid to be processed can be processed under more uniform condition in the circumferential direction. However, this does not prevent the use of the plurality of the slits having different widths and does not prevent an embodiment as the distance between the plurality of the slits is uneven.

In the case that the screen is made not to rotate, in individual control, it is only necessary to consider the rotation number of the rotor, on the contrary, in the case that the screen is made to rotate in the opposite direction to the rotor, it can be suitable for extremely fine dispersion and emulsification such as nano-dispersion and nano-emulsification.

Effect of the Invention

In the present invention, the intermittent jet flow has further studied; and as a result, a stirrer which can more efficiently perform shearing applied to the fluid to be processed by an action of the intermittent jet flow could be provided.

In addition, as a result of the efficient shearing, a stirrer that can be realized extremely fine dispersion and emulsification such as nano-dispersion and nano-emulsification could be provided.

In addition, a stirrer that can obtain particles having a narrow particle size distribution and uniform particle diameter could be provided.

BEST MODES FOR CARRYING OUT THE INVENTION

Figure 1:
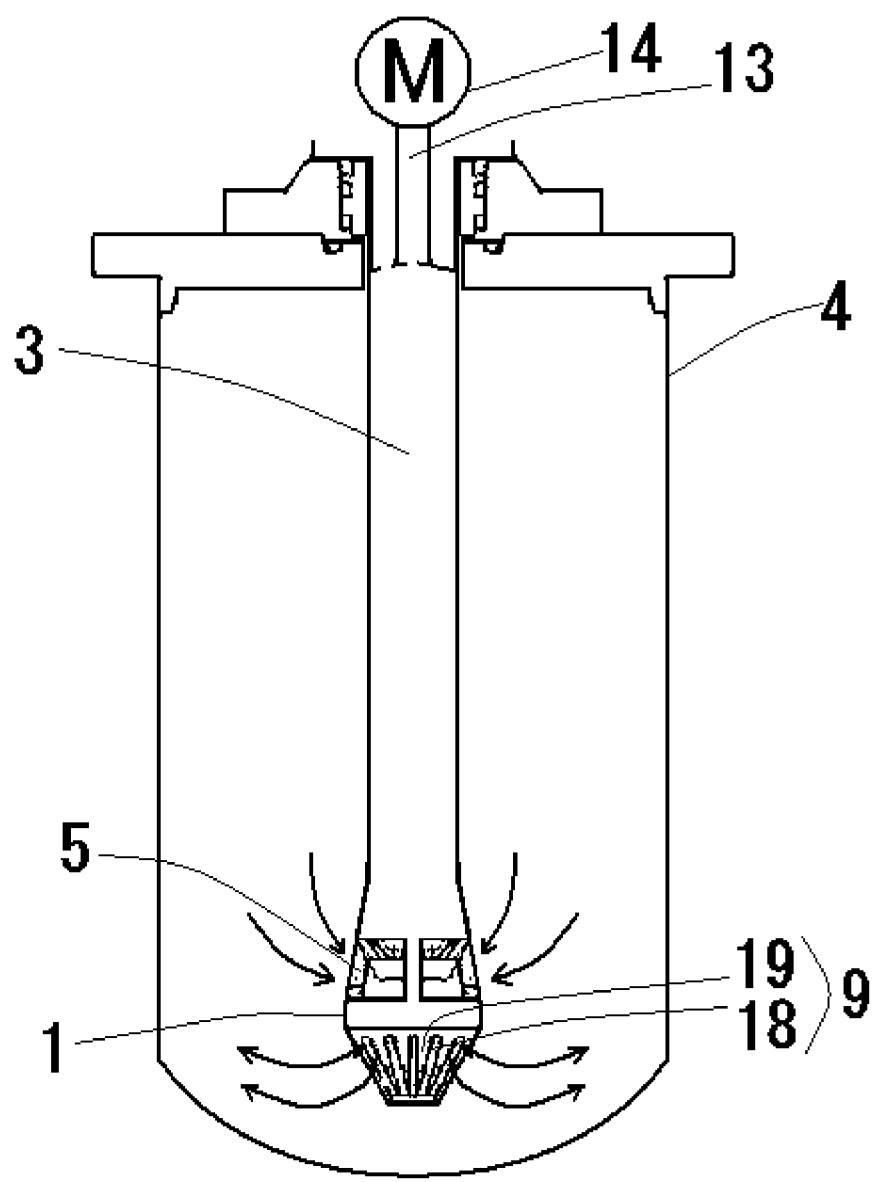
FIG. 1 This is a front view illustrating use state in the stirrer according to one embodiment of the present invention.

Hereinafter, embodiments according to the present invention will be explained with referring to the drawings.

Figure 2:
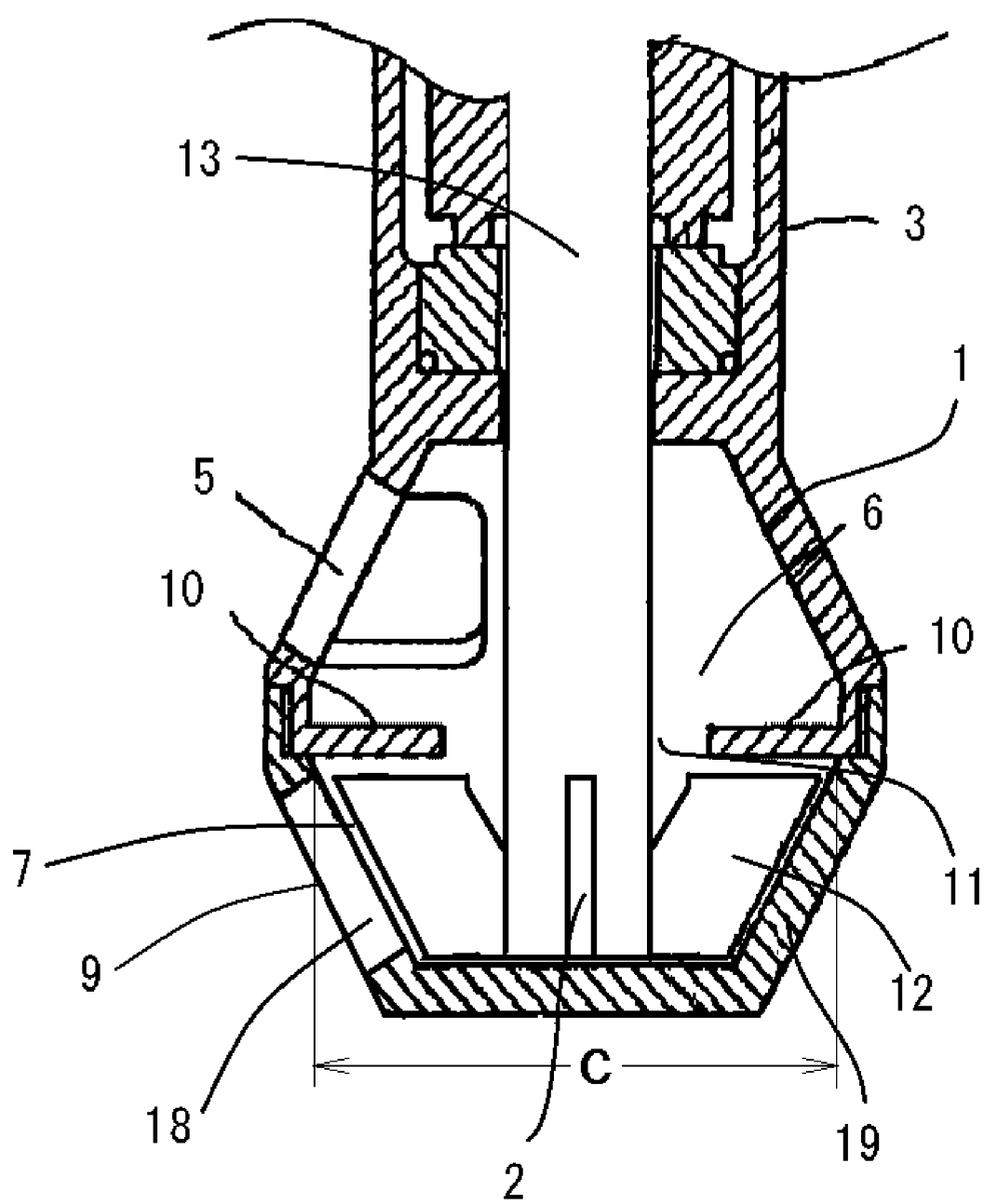
FIG. 2 This is an enlarged vertical cross-sectional view of an essential part of the stirrer.

First, with referring to FIG. 1 and FIG. 2, a basic structure of an example of a stirrer to which the present invention can be applied will be explained.

The stirrer includes a processing member 1 that is arranged in a fluid to be processed, which is scheduled to be processed such as emulsification, dispersion, or mixing, and a rotor 2 that is arranged in the processing member 1.

Figure 3:
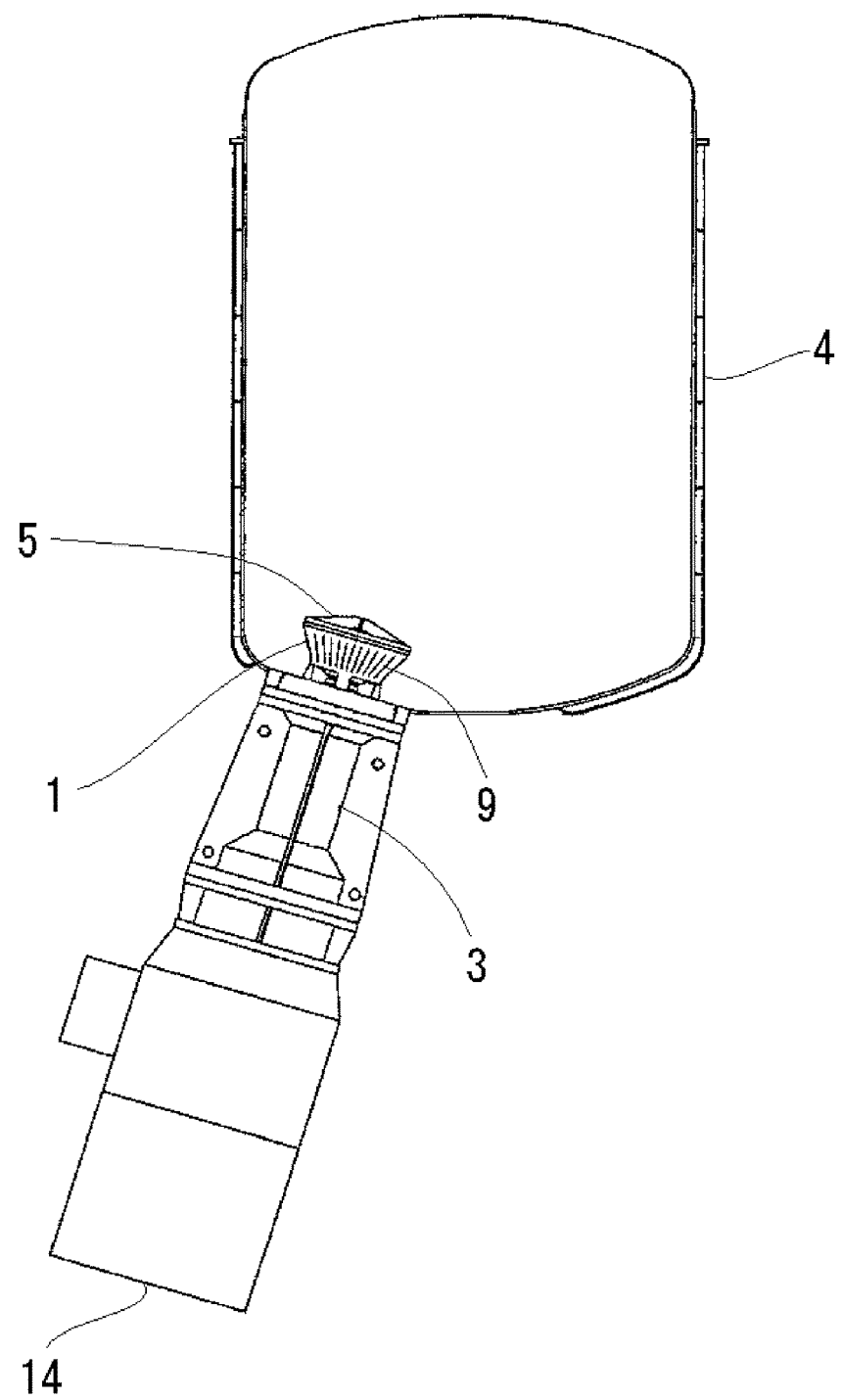
FIG. 3 This is a front view illustrating a use state in the stirrer according to another embodiment of the present invention.

The processing member 1 is a hollow housing and, by being supported by a support tube 3, is arranged in a storing vessel 4 for storing the fluid to be processed, or a flow path of the fluid to be processed. In this example, the processing member 1 is arranged in a front-end of the support tube 3 and is inserted from an upper part of the storing vessel 4 to inside of lower part thereof, but the present invention is not restricted to the example. For example, as shown in FIG. 3, it is also possible to carry out in which the processing member 1 may be supported by the support tube 3 so as to project upward from the bottom surface of the storing vessel 4.

The processing member 1 includes a suction room 6 having a suction part 5 to suck the fluid to be processed from the outside to the inside thereof, and a stirring room 7 conducting to the suction room 6. The outer circumference of the stirring room 7 is defined by a screen 9 having the plurality of slits 18.

In this specification, it will be explained that the screen 9 is composed of the slit 18 which is a void space and a screen member 19 which is an actual member located between the slit 18. Therefore, the screen 9 means an entirety that includes the slit 18 formed in the plurality of the screen members 19, and the screen member 19 means every and each actual member located between the slit 18 being adjacent. Similarly, an inner wall surface or an outer wall surface of the screen 9 means the entire inner wall surface or outer wall surface including the slit 18 formed in the plurality of the screen members 19.

Further, the opening of the plurality of the slits 18 formed on the inner wall surface of the screen 9 is referred to as an inflow opening 28 and the opening of plurality of the slits 18 formed on the outer wall surface of the screen 9 is referred to as an outflow opening 29.

The suction room 6 and the stirring room 7 are partitioned by a partition wall 10 and are connected through an opening for introduction (introduction part) 11 that is provided in the partition wall 10. However, the suction room 6 is not essential; for example, without providing the suction room 6, the entire upper end of the stirring room 7 may be an opening for introduction whereby the fluid to be processed in the storing vessel 4 is introduced directly into the stirring room 7. The partition wall 10 is provided for the purpose to keep a pressure generated upon the fluid to be processed being discharged as the intermittent jet flow from the inside to the outside the screen 9 through the slit 18.

The rotor 2 is a rotating body having the plurality of blades 12 in the circumferential direction, the rotor 2 and the screen 9 are arranged coaxially, and they rotate while keeping a minute clearance between the blade 12 and the screen 9. To rotate the rotor 2, various rotation driving structures may be adapted; in this example, the rotor 2 is arranged at the tip of a rotation axis 13 and rotatably accommodated in the stirring room 7. More specifically, the rotation axis 13 is inserted into the support tube 3 and is further arranged so as to reach the stirring room 7 through the suction room 6 and the opening 11 of the partition wall 10; and the rotor 2 is attached to the tip thereof (lower end in the drawing). The rear end of the rotation axis 13 is connected to a rotation drive device such as a motor 14. It is preferable to use the motor 14 having a control system such as numeral control or being placed under a computer control.

In this stirrer, when the rotating blade 12 passes through the inner wall surface of the screen member 19 due to the rotation of the rotor 2, by a shear force applied to the fluid to be processed existed between them, emulsification, dispersion, or mixing is performed. At the same time, the rotation of the rotor 2 gives kinetic energy to the fluid to be processed, and the fluid to be processed passes through the slit 18 thereby further accelerated, and consequently the fluid to be processed is discharged from the stirring room 7 while forming the intermittent jet flow. Due to the intermittent jet flow, a liquid-liquid shear force is generated on interface velocity, thus processing of emulsification, dispersion, or mixing is performed.

The screen 9 has a cylindrical shape with a circular cross-section. With regard to the screen 9, it is preferable that, for example, the diameter thereof be gradually smaller as it is farther from the introduction opening 11 in axial direction (in the example of FIG. 2, toward a downward direction), like a cone shape of the surface shape. The diameter thereof may also be constant in an axial direction, but in that case, the discharge amount from the slit 18 is large near the introduction part 11 (upper part in FIG. 2); on the contrary, the discharge amount is small in a place apart from the introduction part 11 (lower part in FIG. 2). As a result, since there is a case that uncontrollable cavitation may occur which causes the risks to lead the malfunction of a machine, therefore, as shown in FIG. 1 and FIG. 2, the screen 9 is preferably the cone shape of the surface shape.

It is shown that the slit 18 extends linearly in the axial direction of the rotation axis 13 (upward and downward directions in the drawings) but may be curved and extended such as spiral shape. Further, although the plurality of the slits 18 are formed at the equal distance in the circumferential direction, they may be formed at different distances, and this does not prevent provision of the slit 18 having a plurality of shapes or sizes.

The slit 18 can be implemented by arbitrarily changing the lead angle thereof. As shown in the drawing, in addition to that the lead angle formed by the plane which is perpendicular to the rotation axis 13 and the extending direction of the slit 18 is 90 degrees, namely, linearly extending to vertical direction, it may be curved and extended in the vertical direction, such as spiral shape having a predetermined lead angle.

The blade 12 of the rotor 2 can be made so as to be linearly extended with a constant width radially from a center of the rotor 2 in a transverse section (cross section which is perpendicular to the axial direction of the rotation axis 13); and in addition, the blade may be gradually increased in width toward the outside direction or may extend outward while being curved.

Further, in these blades 12, a lead angle of a front-end part 21 thereof can be arbitrarily changed. For example, the lead angle formed by the plane orthogonal to the rotation axis 13 and the extending direction of the front-end part 21 extends linearly in upward and downward directions at 90 degree, as well as the blade may be windingly extended to upward and downward directions, such as a spiral shape having a predetermined lead angle.

The shape of these individual composition members includes a matching region where the front-end part 21 of the blade 12 and the slit 18 are overlapped with each other at the same position in a longitude direction of the slit 18 (upward and downward directions in the drawing). Then, due to the rotation of the rotor 2, the fluid to be processed is sheared between the blade 12 and the screen member 19 in this matching region, and as the blade 12 rotates, a kinetic energy so as to generate the intermittent jet flow can be given to the fluid to be processed that is passing through the slit 18.

The clearance between the screen 9 and the blade 12 can be arbitrarily changed within the range which the shearing and the intermittent jet flow are generated, though usually the clearance is preferably in the range of about 0.2 mm to about 2.0 mm. When the screen 9 having an entirely tapered shape as shown in FIG. 2 is used, this clearance can be readily adjusted by making at least any one of the stirring room 7 and the blade 12 movable.

Figure 4:
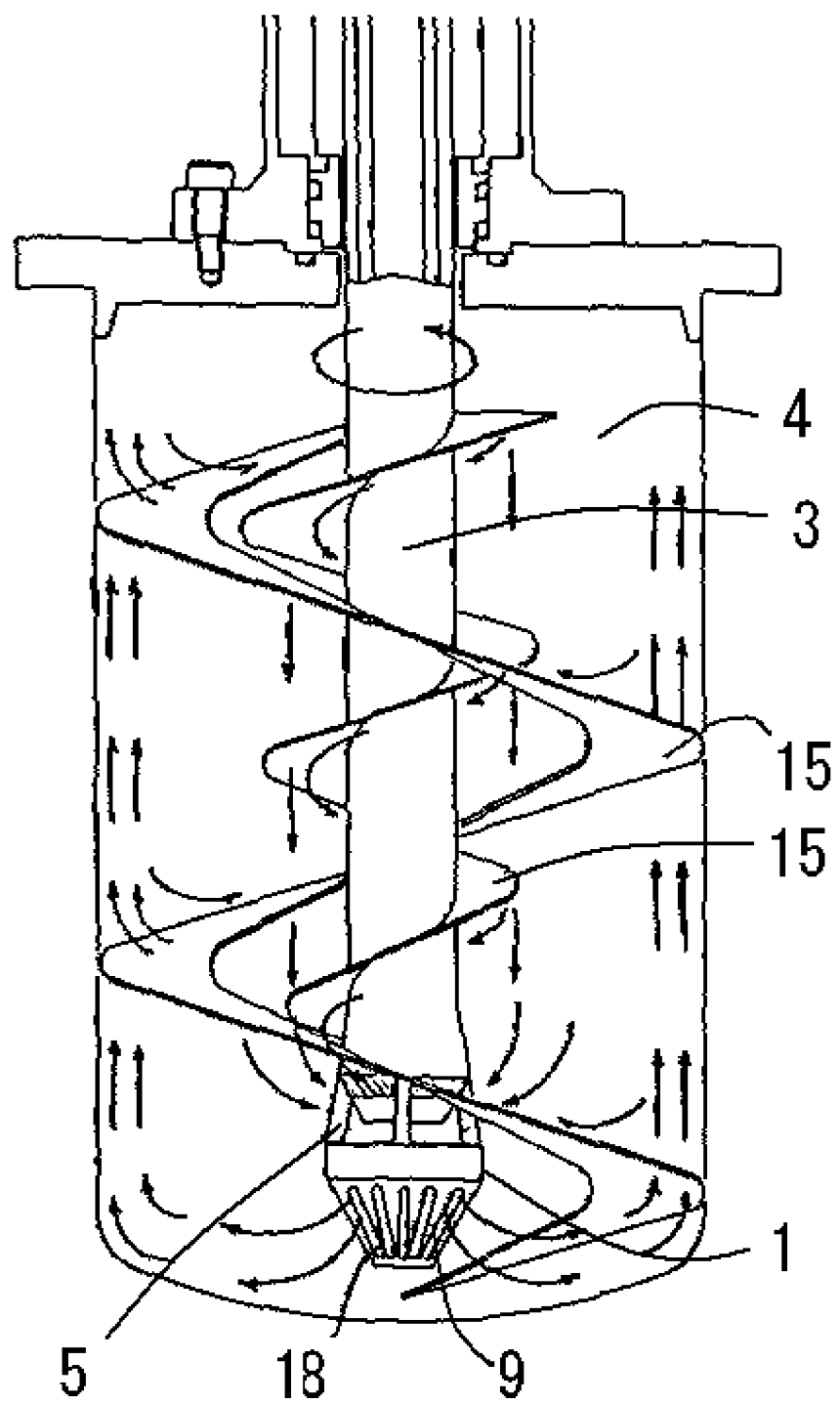
FIG. 4 This is a front view illustrating a use state in the stirrer according to still another embodiment of the present invention.
Figure 5:
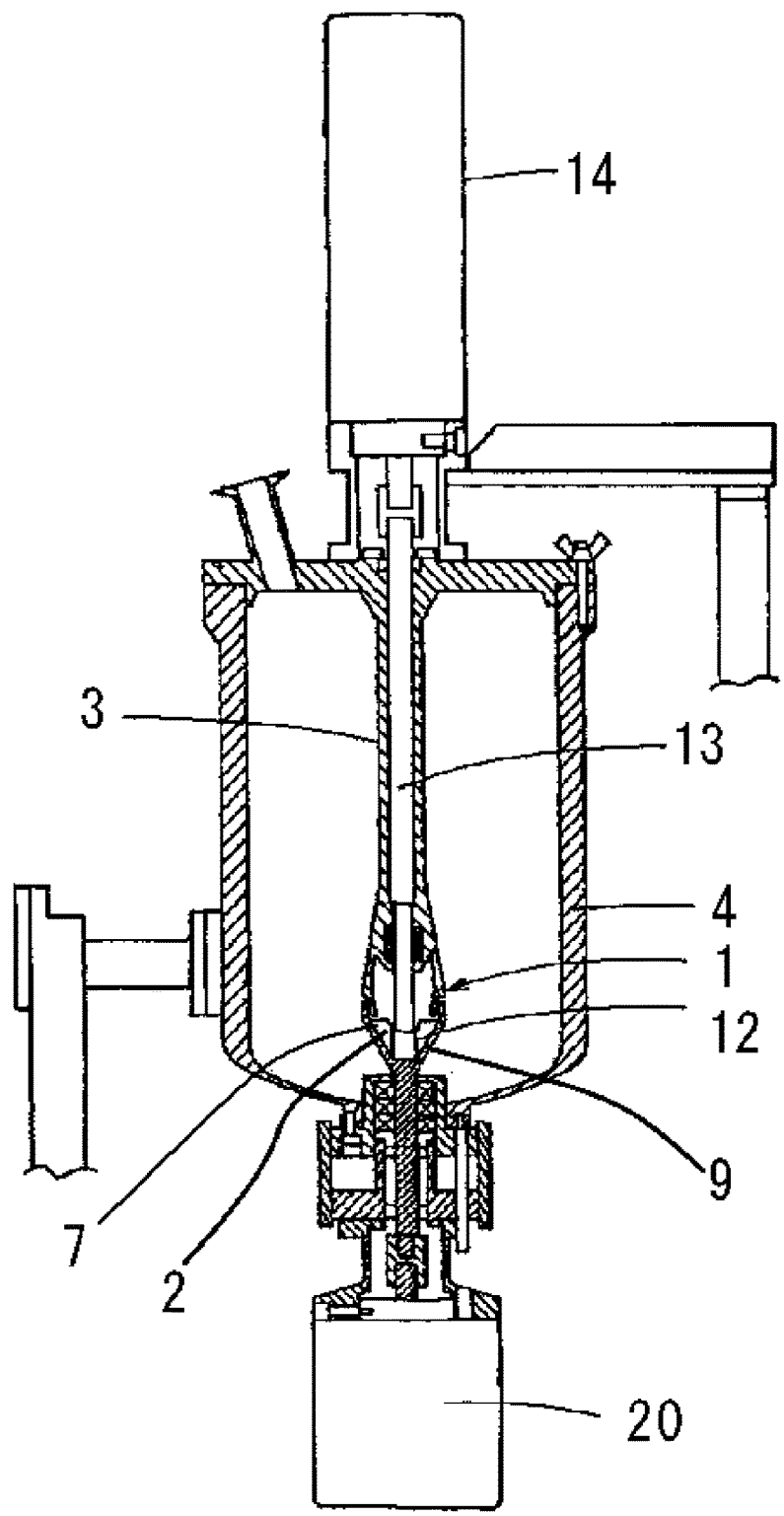
FIG. 5 This is a front view illustrating a use state in the stirrer according to further still another embodiment of the present invention.

In addition, as another structure of the stirrer, those shown in FIG. 4 and FIG. 5 may be also adopted.

In the example of FIG. 4, in order to perform uniform stirring of the entire fluid to be processed in the storing vessel 4, a separate stirring apparatus is arranged in the storing vessel 4. Specifically, a stirring blade 15 for stirring the entire storing vessel 4 may be arranged so as to rotate in the same body together with the stirring room 7. In this case, the stirring blade 15 and the stirring room 7 having the screen 9 are rotated together. At that time, the rotation direction of the stirring blade 15 and of the stirring room 7 may be the same as or opposite to the rotation direction of the rotor 2. Namely, since the rotation of the stirring room 7 having the screen 9 is slower as compared with the rotation of the rotor 2 (specifically, a peripheral velocity of rotation of the screen is in the range of about 0.02 m to about 0.5 m/second), there is no substantial effect on generation of the shearing and the intermittent jet flow.

Further, in the example of FIG. 5, the stirring room 7 is rotatable with respect to the support tube 3, a rotation axis of a second motor 20 is connected to the front-end of the stirring room 7, and the screen 9 can be rotated at high speed. The rotation direction of the screen 9 is opposite to the rotation direction of the rotor 2 arranged inside the stirring room 7. By so doing, a relative rotation speed between the screen 9 and the rotor 2 is increased.

In the stirrer described above, the present invention may be applied in the way as described below.

In the stirrer according to the present invention, the process of emulsification, dispersion, or mixing is performed by generation of a liquid-liquid shear force in a speed interface by the intermittent jet flow. At this time, in the stirrer according to the embodiments of the present invention, for example, the blades 12 and the screens 9 shown in FIG. 6(A), FIG. 6(B), and FIG. 8 may be used.

Figure 8:
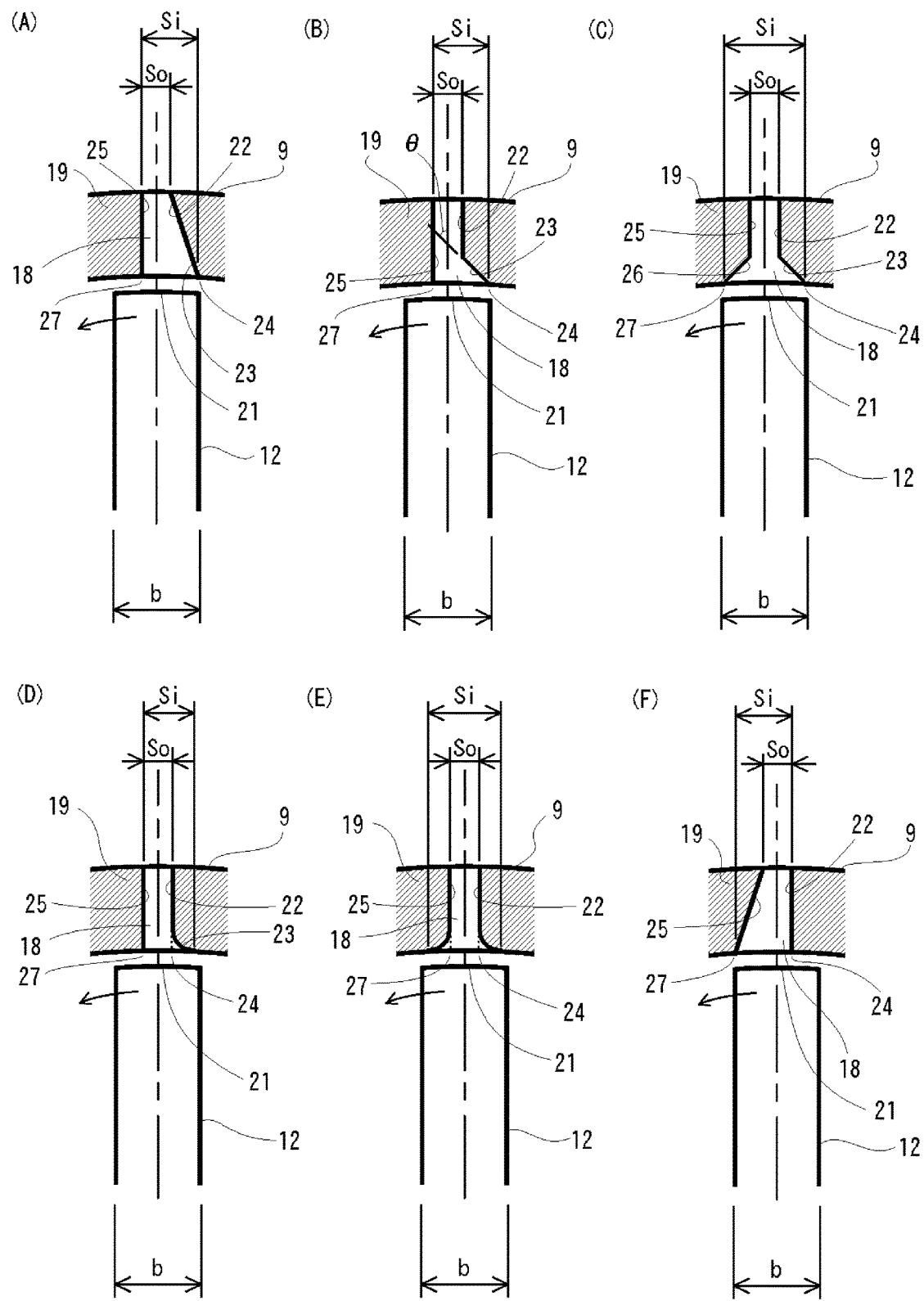
FIG. 8 (A) to (F) are enlarged views of essential parts of the stirrers according to embodiments of the present invention.

With regard to the stirrer according to the present invention, the plurality of the slits 18 are provided so that the width (So) of the outflow opening 29 in the circumferential direction is made so as to be narrower than the width (Si) of the inflow opening 28 in the circumferential direction, further, the plurality of the slits 18 are defined by the front-side end surface 22 and the back-side end surface 25 that are arranged with a distance in the rotation direction of the plurality of the blades 12, and preferably, at least the area 23 on the inflow side of into the slit 18 of the front-side end surface 22 is inclined forward in the rotation direction of the plurality of blades 12. The inclination to forward means that the plurality of blades 12 is inclined forward in the rotation direction as the area 23 on the inflow side into the front-side end surface 22 of the slit 18 is directed toward the outer diameter direction of the screen 9. Illustrative examples thereof, the examples of the slit 18 include those shown in FIG. 6(A), FIG. 6(B), and each of FIG. 8. Illustrative examples thereof is described that as shown in FIG. 8(A), the entire front-side end surface 22 is inclined forward in the rotation direction of the plurality of the blades 12; as shown in FIG. 8(B), at least the area 23 on the inflow side into the slit 18 of the front-side end surface 22 is inclined forward in the rotation direction of the plurality of blades 12; as shown in FIG. 6(A) and FIG. 6(B), the entire front-side end surface 22 is inclined forward in the rotation direction of the plurality of blades 12 and the entire back-side end surface 25 is inclined backward in the rotation direction of the plurality of blades 12, and the inclination angle of the front-side end surface 22 and the back-side end surface 25 are the same; as shown in FIG. 8(C), the area 23 on the inflow side into the slit 18 of the front-side end surface 22 is inclined forward in the rotation direction of the plurality of blades 12 and the area 26 on the inflow side into the slit 18 of the back-side end surface 25 is inclined backward in the rotation direction of the plurality of blades 12, and the inclination angle of the area 23 on the inflow side is the same as the inclination angle of the area 26 on the inflow side. Here, in the embodiments shown in FIG. 6(A) and FIG. 6(B), it is not necessary that the inclination angle of the front-side end surface 22 is the same as the inclination angle of the back-side end surface 25; and in the embodiment shown in FIG. 8(C), it is not necessary that the inclination angle of the area 23 on the inflow side is the same as the inclination angle of the area 26 on the inflow side. Further, it may be that as shown in FIG. 8(D), the edge 24 of the inflow opening composed of the front-side end surface 22 and the inner wall surface of the screen member 19 is rounded; and as shown in FIG. 8(E), both the edge 24 of the inflow opening composed of the front-side end surface 22 and the inner wall surface of the screen member 19 and an edge 27 of the inflow opening composed of the back-side end surface 25 and the inner wall surface of the screen member 19 are rounded. The slit 18 in which the edge 24 and edge 27 of the inflow opening are rounded are preferable because those edges do not stand, thus a pressure drop of the fluid to be processed can be reduced as compared with the edge having obtuse angle. Even the embodiments of the slit 18 having the edge 24 and the edge 27 of the inflow opening are rounded, it is included in the embodiment in which at least the area 23 on the inflow side into the slit 18 of the front-side end surface 22 is inclined forward in the rotation direction of the plurality of blades 12.

Further, as shown in FIG. 8(F), it is may be possible that the entire back-side end surface 22 is inclined backward in the rotation direction of the plurality of blades 12 rather than that the front-side end surface 22 is inclined, and though not shown in the drawing, it may be that the edge 24 of the inflow opening composed of the back-side end surface 25 and the inner wall surface of the screen member 19 is rounded.

Figure 6:
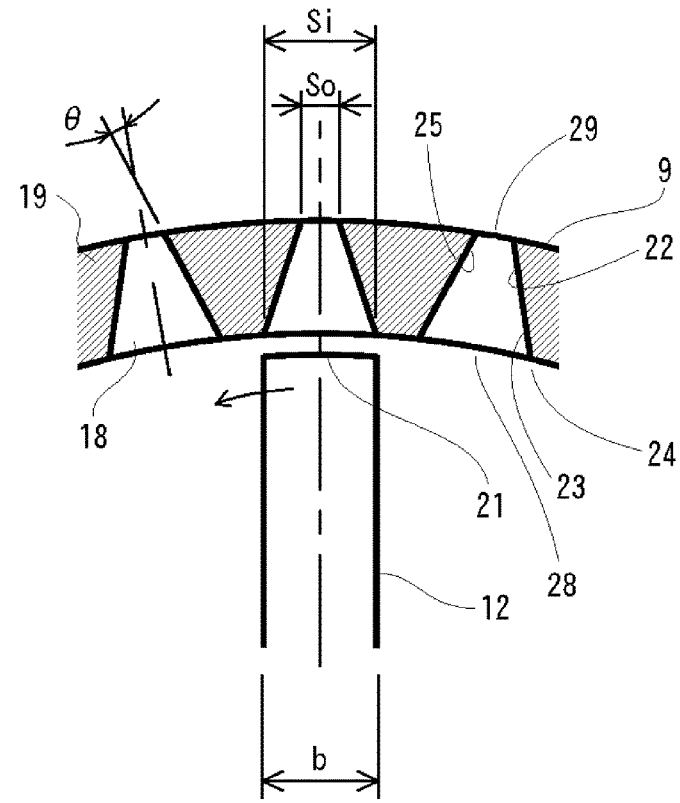
FIG. 6 (A) is an enlarged view of an essential part of the stirrer according to one embodiment of the present invention; and (B) is an enlarged view illustrating the action thereof.
Figure 6:
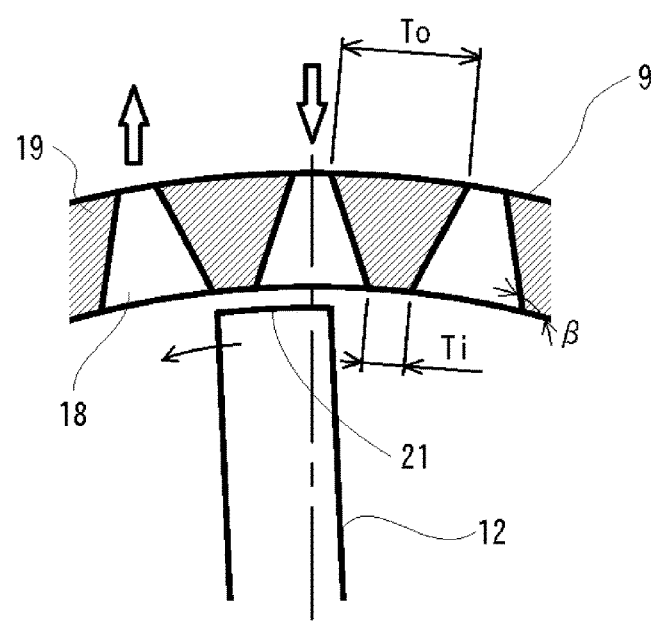
Figure 10:
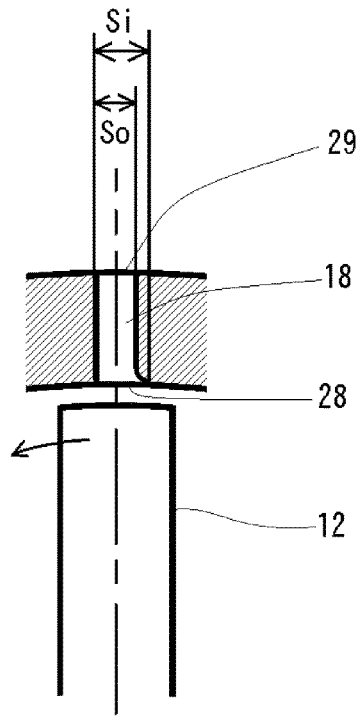
FIG. 10 (A) to (D) are enlarged views of essential parts of the stirrers used in Examples and Comparative Examples of the present invention.
Figure 10:
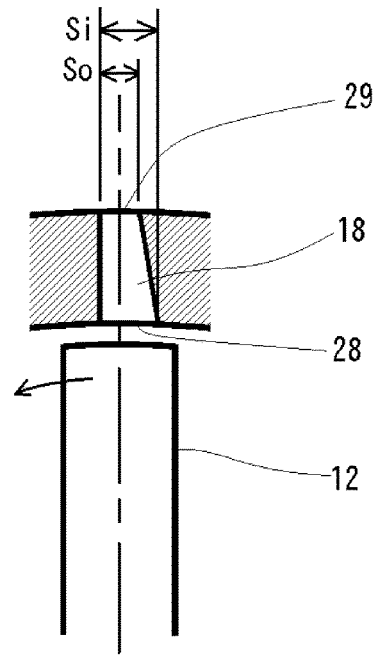
Figure 10:
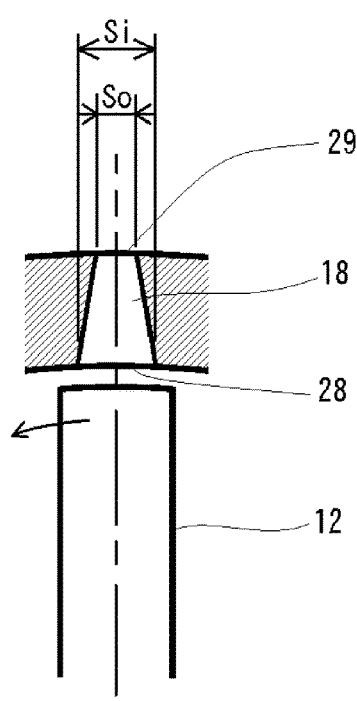
Figure 10:
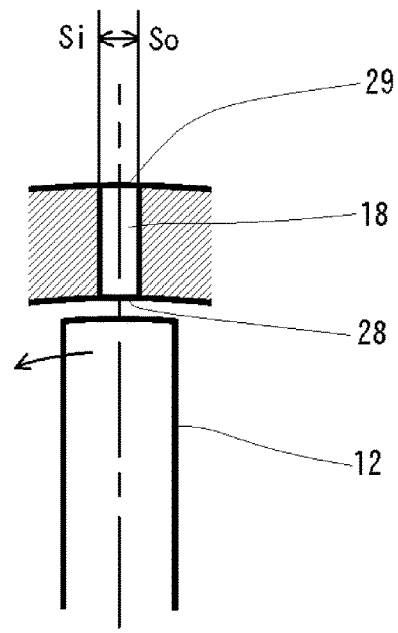

The center lines described in FIG. 6, FIG. 8, and FIG. 10 show a radius direction.

The present invention was achieved by finding being extremely effective in the point that the plurality of the slits 18 are provided so that the width (So) of the outflow opening 29 in the circumferential direction of is so as to be narrower than the width (Si) of the inflow opening 28 in the circumferential direction, and at least the area 23 on the inflow side into the slit 18 of the front-side end surface 22 which defines the screen 9 is inclined forward in the rotation direction of the blade 12, so that in the stirrer, the liquid-liquid shear force at the speed interface can be increased, whereby very fine dispersion and emulsification such as nano-dispersion and nano-emulsification can be realized.

The action of the intermittent jet flow will be explained with comparing to the conventional example described in FIG. 7(A) and FIG. 7(B) and the conventional example described in FIG. 7(C) and FIG. 7(D).

As described above, the intermittent jet flow is generated by the rotation of the blade 12, but to explain this in more detail, the pressure of the fluid to be processed is increased on the front side of the rotation direction of the blade 12. By this, the fluid to be processed is discharged as the intermittent jet flow from the slit 18 located on the front side of the blade 12. On the other hand, in the back side of the rotation direction of the blade 12, a pressure of the fluid to be processed decreases, so that the fluid to be processed is sucked from the slit 18 located in the back side thereof. As a result, on the outside of the screen 9, a forward and reverse flows (discharge and suction) is generated in the fluid to be processed, and by relative speed difference at the interface of the both flows, the liquid-liquid shear force is generated between the fluids to be processed.

Figure 7:
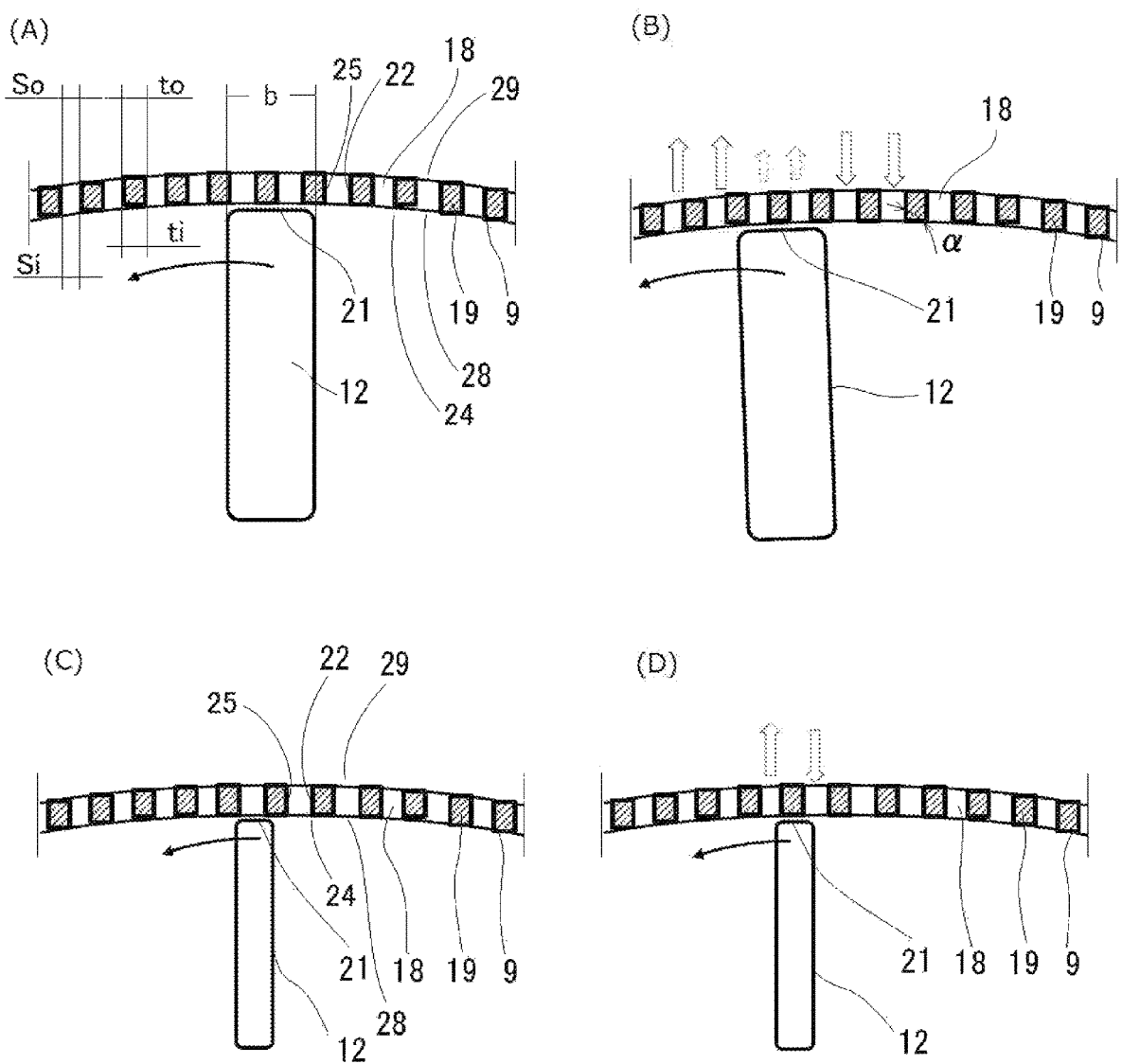
FIG. 7 (A) is an enlarged view of an essential part of the stirrer according to one conventional example; (B) is an enlarged view illustrating the action thereof; (C) is an enlarged view of an essential part of the stirrer according to another conventional example; and (D) is an enlarged view illustrating the action thereof.

In the conventional example shown in FIG. 7(C) and FIG. 7(D), the width (Si) of the inflow opening 28 in the circumferential direction, which is the opening of the slit 18 provided on the inner wall surface of the screen 9, is the same as the width (So) of the outflow opening 29 in the circumferential direction, which is the opening of the slit 18 provided on the outer wall surface of the screen 9, and since the width of the front-end part 21 of the blade 12 is narrow, it is difficult for the fluid to be processed to follow the change of the states between discharge and suction, as a result, the relative speed difference at the interface between the forward and reverse flows (discharge and suction) of the fluid to be processed becomes relatively small state, and thus, the shear force becomes small.

Further, in the conventional example shown in FIG. 7(A) and FIG. 7(B), the same screen 9 (namely, Si=So) as in the conventional example shown in FIG. 7(C) and FIG. 7(D) is used, since the width of the front-end part 21 of the blade 12 thereof is wide, there is a period during which the fluid to be processed is static between discharge and suction. As a result, the fluid to be processed well follows the change in opening and closing of the slit 18 by the blade 12, and the relative speed difference at the interface between the forward and reverse flows (discharge and suction) of the fluid to be processed increases, thereby enabling to increase the shear force generated between the fluids to be processed. The Conditions to well realize this are the following condition 1 and condition 2.

Condition 1: The relationship among a width b of the front-end part 21 of the blade 12 in the rotation direction, the width Si of the slit 18 in the circumferential direction, and the width ti of the screen member 19 in the circumferential direction is $b \geq 2Si+ti$; and Condition 2: The relationship between the width b of the front-end part 21 of the blade 12 in the rotation direction and the maximum diameter c of the screen 9 is $b \geq 0.1c$.

On the other hand, in the embodiment of the present invention as shown in FIG. 6(A) and FIG. 6(B), the plurality of the slits 18 are provided such that the width (So) of the outflow opening 29 in the circumferential direction is narrower than the width (Si) of the inflow opening 28 in the circumferential direction, so that the flow velocity of the intermittent jet flow passing through the slit 18 by the nozzle effect can be accelerated. Further, the plurality of the slits 18 are defined by the front-side end surface 22 and the back-side end surface 25 that are arranged at a distance in the rotation direction of the blades 12, since at least the area 23 on the inflow side into the slit 18 of the front-side end surface 22 (in FIG. 6(A) and FIG. 6(B), the entire front-side end surface 22) is inclined forward in the rotation direction of the blades 12, the edge 24 of the inflow opening becomes an obtuse angle ($\beta$), and thus, an extreme pressure drop at the edge 24 of the inflow opening is reduced and the fluid to be processed is effectively converted into the jet stream. In addition, as a matter of course, a pressure loss of the fluid to be processed is reduced, and thus, generation of cavitation is suppressed, and the generation of bubbles is also suppressed. As a result, the speed of the intermittent jet flow discharged from the inside of the screen 9 to the outside thereof thorough the slit 18 becomes faster than before, and the relative speed difference at the interface between the forward and reverse flows (discharge and suction) of the fluid to be processed becomes large, the shear force generated between the fluids to be processed can be increased.

With Regard to the Screen

The screen 9, as described above, may be carried out as that the diameter of the tapered shape or the like changes. In the present invention, when the inner diameter changes, unless otherwise specifically mentioned, the maximum inner diameter means the maximum inner diameter (c) of the screen 9 in the matching region.

With Regard to the Slit and the Screen Member

As described above, in the embodiment of the present invention, the width (So) of the outflow opening 29 in the circumferential direction is provided so as to be narrower than the width (Si) of the inflow opening 28 in the circumferential direction, and the plurality of the slits 18 is defined by the front-side end surface 22 and the back-side end surface 25 that are arranged with a distance in the rotation direction of the plurality of blades 12, and at least the area 23 on the inflow side into the slit 18 of the front-side end surface 22 is inclined forward in the rotation direction of the plurality of the blades 12. In the forward inclination, depending on the maximum inner diameter (c) of the screen 9, the angle θ of the at least the area 23 on the inflow side into the slit 18 of the front-side end surface 22 to a radius passing through a center of the outflow opening 29 in the circumferential direction is preferably in the range of 1 to 45 degrees, and more preferably in the range of 5 to 30 degrees. Specifically, as shown in FIG. 6(A), the angle formed by the extended line of the front-side end surface 22 and the extended line of the radius passing through the center of the outflow opening 29 in the circumferential direction is set to θ, or as shown in FIG. 8(B), the angle formed by the extended line of the area 23 on the inflow side into the slit 18 of the front-side end surface 22 and the extended line of the radius passing through the center of the outflow opening 29 in the circumferential direction is set to θ.

The slit 18 may be extended parallel to the axial direction of the rotation axis of the rotor 2 or may have an angle with respect to the axial direction such as one extending in spiral shape. In any cases, in the present invention, unless otherwise specifically mentioned, the width of the slit 18 in the circumferential direction is a length of the screen 9 in the circumferential direction in the matching region (in other words, a direction perpendicular to the axial direction of the rotation axis of the rotor 2). A position of the slit 18 in the axial direction of the rotation axis of the rotor 2 is not restricted so far as it is in the matching region, though it is preferably at least the position where the axial direction of the rotation axis 13 is the maximum inner diameter (c) of the screen 9. As an Example of the width of the slit 18 in the circumferential direction, the width (Si) of the inflow opening 28 in the circumferential direction and the width (So) of the outflow opening 29 in the circumferential direction can be mentioned.

The width (So) of the outflow opening 29 in the circumferential direction is preferably in the range of 0.2 to 4.0 mm, and more preferably in the range of 0.5 to 3.0 mm, though the width may be arbitrarily changed on the condition that the intermittent jet flow is generated. Further, it is preferable that the width of the slit 9 in the circumferential direction be gradually narrowed as heading from the inflow opening 28 to the outflow opening 29.

From the viewpoint of the nozzle effect, as shown in FIG. 8(F), it can be carried out that the entire back-side end surface 22 is inclined backward in the rotation direction of the plurality of the blades 12 rather than that the front-side end surface 22 is inclined, or though not shown, the edge 24 of the inflow opening composed of the back-side end surface 25 and the inner wall surface of the screen member 19 is rounded.

In order to satisfy both suppression of the cavitation and the nozzle effect, it is preferable to use the slit 18 as shown in FIG. 6(A), FIG. 6(B), and FIG. 8(A) to FIG. 8(E).

The width of the screen member 19 in the circumferential direction (in other words, the distance in the circumferential direction between the slits 18 being adjacent with each other) can be arbitrarily changed. As the illustrative example of the width of the screen member 19 in the circumferential direction, it includes the width (ti) of the inner wall surface of the screen member 19 in the circumferential direction and the width (to) of the outer wall surface of the screen member 19 in the circumferential direction, the width (to) of the outer wall surface of the screen member 19 in the circumferential direction is preferably in the range of 1 to 15 times, more preferably in the range of about 2 to about 10 times, relative to the width (So) of the outflow opening 29 in the circumferential direction. When the width (to) of the outer wall surface of the screen member 19 in the circumferential direction is made too wide, the number of shearing is reduced which leads to a decrease in the amount of the processing performance, or when this width is made too narrow, this may be substantially the same as the slit 18 being continuous, or a mechanical strength may be significantly reduced.

With Regard to the Rotor

As described above, the rotor 2 is a rotating body having the plurality of the blades 12.

The blade 12 may be used those shown in FIG. 7(C) and FIG. 7(D) (the width b of the blade 12 in the rotation direction is almost the same as the widths (Si and So) of the slit 18 in the circumferential direction, or the width b of the blade 12 of the rotor 2 in the rotation direction is slightly wider than the other widths) or may be used those shown in FIG. 7(A) and FIG. 7(B) (the width of the front-end part 21 of the blade 12 is wider than the widths (Si and So) of the slit 18 in the circumferential direction). When the width b of the blade 12 of the rotor 2 in the rotation direction is narrower than the widths (Si and So) of the slit 18 in the circumferential direction, particularly when the width b is narrower than the width (Si) of the inflow opening in the circumferential direction, it is not preferable in view of generation of the intermittent jet flow.

When the blade 12 shown in FIG. 7(A) and FIG. 7(B) is applied in the present invention, the relationship among the width b of front-end part 21 of the blade 12 in the rotation direction, the widths (Si and So) of the slit 18 in the circumferential direction, and the widths (ti and to) of the screen member 19 in the circumferential direction (condition 1 described above) can also be applied to the present invention, but in this case, it is suitable to adjust the width of the slit 18 in the circumferential direction by using the width (Si) of the inflow opening 28 in the circumferential direction.

Preferred Application Condition

The numerical conditions of the screen 9, the slit 18, and the rotor 2 to which the preset invention can be applied, and which are considered to be suitable for mass production with the current technological capabilities are as follows.

Maximum inner diameter (c) of the screen 9: 30 to 500 mm (however, maximum diameter in the above-mentioned matching region)

Rotation number of the screen 9: 15 to 390 rotations/second
Number of the slit 18: 12 to 500
Maximum outer diameter of the rotor 2: 30 to 500 mm
Rotation number of the rotor 2: 15 to 390 rotations/second Needless to say, these numerical conditions are merely shown as one example, for example, with progress of technologies such as rotation control in future, the present invention does not exclude the adoption of the conditions other than the above conditions.

EXAMPLES

Hereinafter, the present invention will be explained more specifically by showing Examples and Comparative Examples. However, the present invention is not restricted to the Examples described below.

The shape of the cross-sectional view of the slit 18 used in the Examples are shown in FIG. 10(A) to FIG. 10 (C), and the shape of the cross-sectional view of the slit 18 used in Comparative Examples is shown in FIG. 10 (D). The slit used in the Examples is provided such that the width (So) of the outflow opening 29 in the circumferential direction is narrower than the width (Si) of the inflow opening 28 in the circumferential direction, and in the slit used in Comparative Examples, the width (Si) of the inflow opening 28 in the circumferential direction is the same as the width (So) of the outflow opening 29 in the circumferential direction (Si=So).

More specifically, in FIG. 10(A), the slits used in Examples has rounded (R0.4) on the edge 24 of the inflow opening composed of the front-side end surface 22 and the inner wall surface of the screen member 19; in FIG. 10(B), the entire front-side end surface 22 is inclined forward in the rotation direction of the plurality of blades 12; and in FIG. 10(C), the entire the front-side end surface 22 is inclined forward in the rotation direction of the plurality of blades 12 while the entire back-side end surface 25 is inclined backward in the rotation direction of the plurality of blades 12, and the angle of inclination of the front-side end surface 22 is the same as the angle of inclination of the back-side end surface 25.

In FIG. 10(A), the width (So) of the outflow opening 29 in the circumferential direction is 1 mm, and the width (Si) of the inflow opening 28 in the circumferential direction is 1.4 mm. In FIG. 10(B), the width (So) of the outflow opening 29 in the circumferential direction is 1 mm, and the width (Si) of the inflow opening 28 in the circumferential direction is 1.5 mm. In FIG. 10(C), the width (So) of the outflow opening 29 in the circumferential direction is 1 mm, and the width (Si) of the inflow opening 28 in the circumferential direction is 2 mm. In FIG. 10(D), the width (So) of the outflow opening 29 in the circumferential direction and the width (Si) of the inflow opening 28 in the circumferential direction are both 1 mm.

In each of Tables described below, as the shape of the cross-sectional view of the slit 18 used in Examples and Comparative Examples, when the slit shown in FIG. 10(A) is used, it is indicated in "A"; when the slit shown in FIG. 10(B) is used, it is indicated in "B"; when the slit shown in FIG. 10(C) is used, it is indicated in "C"; and when the slit shown in FIG. 10(D) is used, it is indicated in "D". The unit of dimension shown in each of FIG. 10 is millimeter (mm).

Here, the number of the slit 18 provided on the screen 9 is 24.

Measurement of Particle Size Distribution

In Examples, the particle size distribution was measured by using MT-3300 (manufactured by Nikkiso Co., Ltd.). Pure water was used as the measurement solvent, the particle refractive index was 1.81, and the solvent refractive index was 1.33. As for the result, the result of the volume distribution was used.

Figure 9:
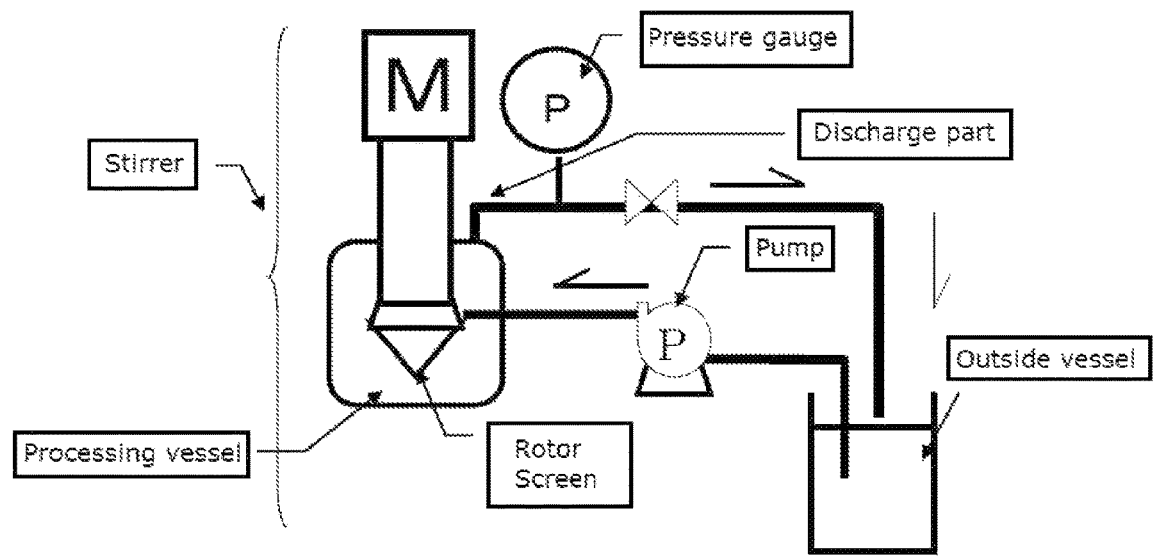
FIG. 9 are explanatory drawings of test apparatuses of Examples and Comparative Examples of the present invention.
Figure 9:
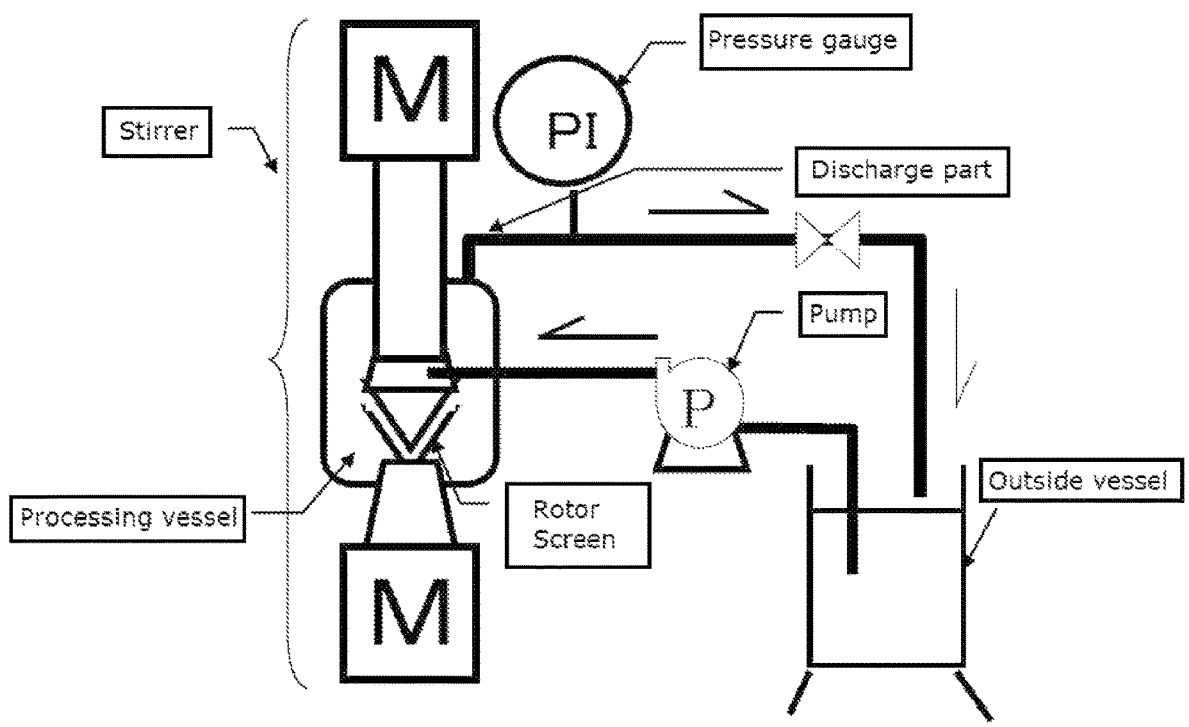

As Example 1, by using the stirrer according to the first embodiment of the present invention (FIG. 1 and FIG. 2), an emulsification experiment of liquid paraffin and pure water was carried out with the test apparatus shown in FIG. 9(A). Prescription used in the emulsification experiment was liquid paraffin at 29.4% by weight of, pure water at 68.6% by weight, and a mixture of Tween 80 at 1.33% by weight and Span 80 at 0.67% by weight as emulsifier. The fluid to be processed, which was formulated as described above, was used as preliminary mixed product, and the preliminary mixed product in an outside vessel was introduced into processing vessel 4 in which the stirrer of the present invention was laid by a pump in the test apparatus shown in FIG. 9(A), the inside of the processing vessel 4 was sealed with liquid, and by introducing the fluid to be processed into the processing vessel 4 by the pump, the fluid to be processed was discharged from the discharge part, then the fluid to be processed was discharged from screen to carry out the emulsification process by rotating the rotor 2 of the stirrer of the present application at 356.7 (rotation/second) while circulating the fluid to be processed between the processing vessel 4 and the outside vessel at 2500 g/minute.

The number of the blade 12 (4 or 6) and the shape of the cross-sectional view (cross-sectional view that is perpendicular to the rotation axis 13 in the axial direction) of the slit 18 were changed, and the value of the average particle diameter (D50) and the coefficient of variation (C.V.) of the particle diameter in the measurement result of the particle size distribution of the emulsified particles obtained after 20 minutes from the start of the emulsification process is shown in Table 1.

The coefficient of variation of the particle diameter is an index showing a degree of uniformity of the obtained particles and is obtained from the average particle diameter (D50) and the standard deviation in the particle size distribution of the particle by using the equation: Coefficient of Variation (C.V.) (%)=Standard Deviation÷Average Particle Diameter (D50)×100. When the value of the coefficient of variation is smaller, the particle size distribution of the obtained particles is narrower, and uniformity as the particle is higher.

Here, the peripheral velocity V of the rotation of the rotor 2 is V=D×π×N, when the maximum outer diameter of the rotor in the matching region is set to D (m) and the rotation number of the rotor is set to N (rotations/second). The rotor diameter D described in Table 1 to Table 8 is the maximum outer diameter of the rotor 2.

Measurement of Particle Size Distribution

In Examples, the measurement of particle size distribution was used MT-3300 (manufactured by Nikkiso Co., Ltd.). Pure water was used as the measurement solvent, the particle refractive index was 1.81, and the solvent refractive index was 1.33. As for the result based on the above, the result of volume distribution was used.

As can be seen in Table 1, when the peripheral velocity of rotation of the rotor 2 was 33.6 [m/second], it is found that by being provided the width (So) of the outflow opening 29 of the slit 18 in the circumferential direction so as to be narrower than the width (Si) of the inflow opening 28 in the circumferential direction and by being increased the width ratio thereof (Si/So), the values of D50 and of the C.V. became smaller, and it was found that the emulsified particles having fine particle diameter and narrow particle size distribution can be produced.

As for Example 2, the result obtained in the same manner as in Example 1 is shown in Table 2 except that the rotation number of the rotor 2 is 333.3 (rotations/second), and the peripheral velocity of rotation of the rotor 2 is V=31.4 (m/second).

As for Example 3, the result obtained in the same manner as in Example 1 is shown in Table 3 except that the rotation number of the rotor 2 is 300 (rotations/second), the number of the blades in the rotor 2 is 6, and the peripheral velocity of the rotation is V=28.3 (m/second).

As for Example 4, the result obtained in the same manner as in Example 1 is shown in Table 4 except that the rotation number of the rotor 2 is 250 (rotations/second), the number of the blades in the rotor 2 is 6, and the peripheral velocity of the rotation is V=23.6 (m/second).

As for Comparative Example 1, emulsification processing was carried out in the same manner as Example 1 except that the shape of the cross-sectional view of the slit 18 provided on the screen 9 is the conventional type (Si=So) as shown in FIG. 10(D). The result thereof is shown in Table 5.

As for Comparative Example 2, emulsification processing was carried out in the same manner as Example 2 except that the shape of the cross-sectional view of the slit 18 provided on the screen 9 is the conventional type (Si=So) as shown in FIG. 10(D). The result thereof is shown in Table 6.

As for Comparative Example 3, emulsification processing was carried out in the same manner as Example 3 except that the shape of the cross-sectional view of the slit 18 provided on the screen 9 is the conventional type (Si=So) as shown in FIG. 10(D). The result thereof is shown in Table 7.

As for Comparative Example 4, emulsification processing was carried out in the same manner as Example 4 except that the shape of the cross-sectional view of the slit 18 provided on the screen 9 is the conventional type (Si=So) as shown in FIG. 10(D). The result thereof is shown in Table 8.

In Example 1 and Comparative Example 1, the state of the inside of the slit 18 (hereinafter, inside of the slit) after 36 hours of continuous operation of the stirrer was visually confirmed to judge the state of erosion. The state where the erosion clearly occurred is indicated as "x", the state where mirror surface become clouded state is indicated as "0", and the state where the inside of the slit did not change before and after 36 hours of the operation and no erosion occurred is indicated "O". They are shown in Table 1 and Table 5.

From the results of the above, it was founded that by being provided the width (So) of the outflow opening 29 of the slit 18 in the circumferential direction so as to be narrower than the width (Si) of the inflow opening 28 in the circumferential direction and by being increased the ratio of the widths thereof (Si/So), the average particle diameter (D50) of the slit became clearly smaller than that of the conventional type (Si=So), and further the C.V. value which is the index of variation of the particle diameter, became smaller. It was also found that the occurrence of erosion due to cavitation could be prevented. Further, in Comparative Examples 1 to 4, the slit 18 of the screen 9 having the shape of the cross-section is used as shown in FIG. 10 (D), but, comparing to Comparative Example 2, in comparative Example 1 in which the rotor 2 rotates at a higher speed than that of Comparative Example 2, the values of the average particle diameter (D50) and of C.V. are both deteriorated. It is considered that this is because of the result of generation of hollowing phenomenon due to the cavitation.

TABLE 1

Rotation number N = 356.7 [rotations/second]; Rotor diameter D = 0.030 [m];
Peripheral velocity V = 33.6 [m/second]

| Temperature of processing vessel: 20° C. | | Shape of cross-sectional view of slit | | |
|---|---|---|---|---|
| Pressure of processing vessel: 0.00 MPaG | | A | B | C |
| Number of blade (sheet) | 4 Average particle diameter [μm]/ | 2.31/24.7 | 2.03/23.2 | 1.93/22.8 |
| | 6 C.V. value [%] after 20 minutes | 2.20/23.8 | 1.95/22.9 | 1.85/22.0 |
| State of erosion inside slit (after operation of 36 hours) | | O | O | O |

TABLE 2

Rotation number N = 333.3 [rotations/second]; Rotor diameter D = 0.030 [m];
Peripheral velocity V = 31.4 [m/second]

| Temperature of processing vessel: 20° C. | | Shape of cross-sectional view of slit | | |
|---|---|---|---|---|
| Pressure of processing vessel: 0.00 MPaG | | A | B | C |
| Number of blade (sheet) | 4 Average particle diameter [μm]/ | 2.65/27.5 | 2.36/24.2 | 2.25/23.3 |
| | 6 C.V. value [%] after 20 minutes | 2.57/26.9 | 2.31/23.5 | 2.12/23.1 |

TABLE 3

Rotation number N = 300 [rotations/second]; Rotor diameter D = 0.030 [m];
Peripheral velocity V = 28.3 [m/second]

| Temperature of processing vessel: 20° C. | | Shape of cross-sectional view of slit | | |
|---|---|---|---|---|
| Pressure of processing vessel: 0.00 MPaG | | A | B | C |
| Number of blade (sheet) | 6 Average particle diameter [μm]/ C.V. value [%] after 20 minutes | 3.71/40.8 | 3.08/33.4 | 2.95/33.1 |

TABLE 4

Rotation number N = 250 [rotations/second]; Rotor diameter D = 0.030 [m];
Peripheral velocity V = 23.6 [m/second]

| Temperature of processing vessel: 20° C. | | Shape of cross-sectional view of slit | | |
|---|---|---|---|---|
| Pressure of processing vessel: 0.00 MPaG | | A | B | C |
| Number of blade (sheet) | 6 | Average particle diameter [μm]/ C.V. value [%] after 20 minutes | 5.29/53.2 | 5.05/51.2 | 4.06/49.5 |

TABLE 5

Rotation number N = 356.7 [rotations/second]; Rotor diameter D = 0.030 [m];
Peripheral velocity V = 33.6 [m/second]

| Temperature of processing vessel: 20° C. | | Shape of cross-sectional view of slit |
|---|---|---|
| Pressure of processing vessel: 0.00 MPaG | | D |
| Number of blade (sheet) | 4 Average particle diameter [μm]/ | 3.45/52.5 |
| | 6 C.V. value [%] after 20 minutes | 3.40/52.1 |
| State of erosion inside slit (after operation of 36 hours) | | x |

TABLE 6

Rotation number N = 333.3 [rotations/second]; Rotor diameter D = 0.030 [m];
Peripheral velocity V = 31.4 [m/second]

| Temperature of processing vessel: 20° C. | | Shape of cross-sectional view of slit |
|---|---|---|
| Pressure of processing vessel: 0.00 MPaG | | D |
| Number of blade (sheet) | 4 Average particle diameter [μm]/ | 2.82/32.0 |
| | 6 C.V. value [%] after 20 minutes | 2.77/31.2 |

TABLE 7

Rotation number N = 300 [rotations/second]; Rotor diameter D = 0.030 [m];
Peripheral velocity V = 28.3 [m/second]

| Temperature of processing vessel: 20° C. | | Shape of cross-sectional view of slit |
|---|---|---|
| Pressure of processing vessel: 0.00 MPaG | | D |
| Number of blade (sheet) | 6 Average particle diameter [μm]/ C.V. value [%] after 20 minutes | 4.32/50.3 |

TABLE 8

Rotation number N = 250 [rotations/second]; Rotor diameter D = 0.030 [m];
Peripheral velocity V = 23.6 [m/second]

| Temperature of processing vessel: 20° C. | | Shape of cross-sectional view of slit |
|---|---|---|
| Pressure of processing vessel: 0.00 MPaG | | D |
| Number of blade (sheet) | 6 Average particle diameter [μm]/ C.V. value [%] after 20 minutes | 6.83/65.8 |

Contrary to Examples 1 to 4 and Comparative Examples 1 to 4, Examples 5 and 6 describes that not only the rotor 2 was rotated, but also the screen 9 was rotated in the direction opposite to the rotation of the rotor 2. Namely, this describes the Example according to the second embodiment in the present invention (see FIG. 5). Here, the test apparatus shown in FIG. 9(B) was used. The prescription, the circulation flow amount, and the circulation method are the same as those of Examples 1 to 4. As the shape of the cross-sectional view of the slit 18 provided on the screen 9, (Si>So) shown in FIG. 10(C) was used.

As for Example 5, the result when the relative rotation number of the rotor 2 and the screen 9 was set to N=633 (rotations/second), the number of the blade of the rotor 2 was set to 4, and the relative peripheral velocity was set to V=69.6 m/second is shown in Table 9.

As for Example 6, the result when the relative rotation number of the rotor 2 and the screen 9 was set to N=500 (rotations/second), the number of the blade of the rotor 2 was set to 4, and the relative peripheral velocity was set to V=55.0 m/second is shown in Table 10.

Here, the peripheral velocity V (m/second) of the rotation of the rotor 2 to the screen 9 is V=D×π×N (here, N=N1+N2), when the maximum outer diameter of the rotor in the matching region is set to D (m), the rotation number of the rotor is set to N1, the rotation number of the screen is set to N2, and the relative rotation number of the rotor and the screen is set to N (rotations/second). The rotor diameter D described in Table 9 to Table 10 is the maximum outer diameter.

As for Comparative Example 5, emulsification processing was carried out in the same manner as Example 5 except that the shape of the cross-sectional view of the slit 18 provided on the screen 9 is the conventional type (Si=So) as shown in FIG. 10(D). The result thereof is shown in Table 9.

As for Comparative Example 6, emulsification processing was carried out in the same manner as Example 6 except that the shape of the cross-sectional view of the slit 18 provided on the screen 9 is the conventional type (Si=So) as shown in FIG. 10(D). The result thereof is shown in Table 10.

In Example 5 and Comparative Example 5, the state of the inside of the slit after 24 hours of continuous operation of the stirrer was visually confirmed to judge the state of erosion. The state where the erosion clearly occurred is indicated as "x", the state where mirror surface become clouded state is indicated as "0", and the state where the inside of the slit did not change before and after 24 hours of the operation and no erosion occurred is indicated "O". They are shown in Table 9.

From the results of the above, it was founded that by being provided the width (So) of the outflow opening 28 of the slit 18 in the circumferential direction so as to be narrower than the width (Si) of the inflow opening 29 in the circumferential direction and by being increased the ratio of the widths thereof (Si/So), the average particle diameter (D50) of the slit 18 became clearly smaller than that of the conventional type (Si=So), and further the C.V. value which is the index of variation of the particle diameter, became smaller. It was also found that the occurrence of erosion due to cavitation could be prevented.

Dispersion Process of Pigments

As Example 7, by using the stirrer according to the first embodiment of the present invention (FIG. 1 and FIG. 2), dispersion process of pigments was carried out with the test apparatus shown in FIG. 9(A).

Prescription for the material to be processed was 5% by weight of red pigment (C. I. Pigment Red 254) with the primary particle diameter of 10 to 35 nm, 5% by weight of BYK-2000 (manufactured by BYK Chemie GmbH) as a dispersing agent, and 90% by weight of a mixed solution of propylene glycol monomethyl ether acetate (PGMEA) and propylene glycol monomethyl ether (PGME) (PGMEA/PGME=4/1: volume ratio). The material to be processed as the fluid to be processed, which was formulated as described above, was used as preliminary mixed product, and the preliminary mixed product in the outside vessel was introduced into processing vessel 4 having the stirrer of the present invention by the pump in the test apparatus shown in FIG. 9(A), the inside of the processing vessel 4 was sealed with liquid, and by introducing the fluid to be processed into the processing vessel 4 by the pump, the fluid to be processed was discharged from the discharge part, then the fluid to be processed was discharged from screen to carry out the emulsification process by rotating the rotor 2 of the stirrer of the present application at 333.33 (rotation/second) while circulating the fluid to be processed between the processing vessel 4 and the outside vessel at 2300 g/minute. As the shape of the cross-sectional view of the slit formed in the screen, (Si>So) shown in FIG. 10(C) was used. The value of the average particle diameter (D50) and the coefficient of variation (C.V.) of the particle diameter in the measurement result of the particle size distribution of the pigment microparticles obtained after 45 minutes from the start of the dispersion process is shown in Table 11.

As for Comparative Example 7, emulsification processing was carried out in the same manner as Example 7 except that the shape of the cross-sectional view of the slit provided on the screen is the conventional type (Si=So) as shown in FIG. 10(D).

TABLE 9

Rotation number N = 633 [rotations/second]; Rotor diameter D = 0.035 [m]; Peripheral velocity V = 69.6 [m/second]

| | | Example 5 | Comparative Example 5 |
|---|---|---|---|
| Temperature of processing vessel: 40° C. Pressure of processing vessel: 0.00 MPaG | | Shape of cross-sectional view of slit: C | Shape of cross-sectional view of slit: D |
| Number of blade (sheet) | 4 Average particle diameter [μm]/ C.V. value [%] after 20 minutes | 0.53/13.4 | 0.98/23.5 |
| State of erosion inside slit (after 24 hours of operation) | | O | x |

TABLE 10

Rotation number N = 500 [rotations/second]; Rotor diameter D = 0.035 [m]; Peripheral velocity V = 55.0 [m/second]

| | | Example 6 | Comparative Example 6 |
|---|---|---|---|
| Temperature of processing vessel: 40° C. Pressure of processing vessel: 0.00 MPaG | | Shape of cross-sectional view of slit: C | Shape of cross-sectional view of slit: D |
| Number of blade (sheet) | 4 Average particle diameter [μm]/ C.V. value [%] after 20 minutes | 1.05/25.9 | 1.46/27.6 |

In Example 7 and Comparative Example 7, the state of the inside of the slit after 24 hours of continuous operation of the stirrer was visually confirmed to judge the state of erosion. The state where the erosion clearly occurred is indicated as "x", the state where mirror surface become clouded state is indicated as "0", and the state where the inside of the slit did not change before and after 24 hours of the operation and no erosion occurred is indicated "O". They are shown in Table 11.

Measurement of Particle Size Distribution

In Examples described below, the particle size distribution was measured by using UPA-150UT (manufactured by Nikkiso Co., Ltd.). Pure water was used as the measurement solvent, the particle refractive index was 1.81, and the solvent refractive index was 1.33. As for the result, the result of the volume distribution was used.

From the results of the above, it was founded that by being provided the width (So) of the outflow opening of the slit in the circumferential direction so as to be narrower than the width (Si) of the inflow opening in the circumferential direction, the average particle diameter (D50) of the slit became clearly smaller than that of the conventional type (Si=So), and further the C.V. value which is the index of variation of the particle diameter, became smaller. It was also found that the occurrence of erosion due to cavitation could be prevented.

TABLE 11

Rotation number N = 333.3 [ rotations/second]; Rotor diameter D = 0.030 [m];
Peripheral velocity V = 31.4 [m/second]

| Temperature of processing vessel: 25° C. Pressure of processing vessel: 0.05 MPaG | Example 7 Shape of cross-sectional view of slit: C | Comparative Example 7 Shape of cross-sectional view of slit: D |
|---|---|---|
| Number of blade (sheet) 6 Average particle diameter [nm]/ C.V. value [%] after 45 minutes | 24.5/26.3 | 45.1/41.9 |
| State of erosion inside slit (after operation of 24 hours) | O | Δ |

REFERENCE NUMERALS

1 Processing member
2 Rotor
3 Support tube
4 Storing vessel
5 Suction part
6 Suction room
7 Stirring room
9 Screen
10 Partition wall
11 Opening
12 Blade
13 Rotation axis
14 Motor
15 Stirring blade
18 Slit
19 Screen member
20 Second motor
21 Front-end part
22 Front-side end surface
23 Area of front-side end surface in inflow side
25 Back-side end surface
26 Area of back-side end surface in inflow side
28 Inflow opening
29 Outflow opening
Si Width of inflow opening in circumferential direction
So Width of outflow opening in circumferential direction

The invention claimed is:

1. A stirrer, comprising:
a rotor having a plurality of blades and being mounted for rotation, a partition wall for holding a discharge pressure of the rotor, and a screen laid around the rotor, all of which are provided concentrically,
wherein the screen comprises a plurality of slits extending in an axial direction and spaced apart from each other in a circumferential direction of the screen and a screen member located between the adjacent slits,
wherein in the stirrer, by rotating at least the rotor, a fluid to be processed is discharged as an intermittent jet flow from an inside of the screen to an outside of the screen through the plurality of slits,
wherein the screen forms a cylindrical shape having a circular cross-section,
wherein an opening of the plurality of slits provided on an inner wall surface of the screen is made to serve as an inflow opening, and an opening of the plurality of slits provided on an outer wall surface of the screen is made to serve as an outflow opening, and
wherein a width of the outflow opening in the circumferential direction is set to be narrower than a width of the inflow opening in the circumferential direction.

2. The stirrer according to claim 1, wherein the plurality of the slits of the screen is defined by a front-side end surface and a back-side end surface, the front-side end surface and the back-side end surface being spaced apart from each other in the rotation direction of the plurality of blades, and
wherein at least an area on the inflow side into the slit of the front-side end surface is inclined forward in the rotation direction of the plurality of the blades.

3. The stirrer according to claim 2, wherein an angle of at least the area of the inflow side into the slit of the front-side end surface to a radius passing through a center of the outflow opening in the circumferential direction is in a range of 1 to 45 degrees.

4. The stirrer according to claim 1, wherein the width of the slit in the circumferential direction is gradually narrowed from the inflow opening to the outflow opening.

5. The stirrer according to claim 1, wherein the width of the outflow opening in the circumferential direction is in a range of 0.2 to 4.0 mm.

6. The stirrer according to claim 1, wherein the diameters of the blade and the screen become smaller as the distance from an introduction part, for introducing the fluid to be processed into the inside of the screen, increases.

7. The stirrer according to claim 1, wherein the plurality of slits has the same width in the circumferential direction and are formed at an equal distance in the circumferential direction, and
wherein the screen does not rotate.

8. The stirrer according to claim 1, wherein the plurality of slits has the same width in the circumferential direction and are formed at an equal distance in the circumferential direction, and
wherein the screen rotates in an opposite direction to the rotor.

9. The stirrer according to claim 2, wherein the width of the slit in the circumferential direction is gradually narrowed from the inflow opening to the outflow opening.

10. The stirrer according to claim 3, wherein the width of the slit in the circumferential direction is gradually narrowed from the inflow opening to the outflow opening.

11. The stirrer according to claim 2, wherein the width of the outflow opening in the circumferential direction is in a range of 0.2 to 4.0 mm.

12. The stirrer according to claim 3, wherein the width of the outflow opening in the circumferential direction is in a range of 0.2 to 4.0 mm.

13. The stirrer according to claim 4, wherein the width of the outflow opening in the circumferential direction is in a range of 0.2 to 4.0 mm.

14. The stirrer according to claim 2, wherein the diameters of the blade and the screen become smaller as the distance from an introduction part, for introducing the fluid to be processed into the inside of the screen, increases.

15. The stirrer according to claim 3, wherein the diameters of the blade and the screen become smaller as the distance from an introduction part, for introducing the fluid to be processed into the inside of the screen, increases.

16. The stirrer according to claim 1, wherein the inner wall surface of the screen member between adjacent slits is concave toward a center of the rotor.

17. The stirrer according to claim 1, wherein each slit has a pair of sidewalls extending between the inner wall surface of the screen member and the outer wall surface of the screen member,
wherein at least one sidewall of the pair of sidewalls is straight, and
wherein a transition between the at least one sidewall and the inner wall surface of the screen member is arcuate.

18. The stirrer according to claim 1, wherein each slit has a pair of sidewalls extending between the inner wall surface of the screen member and the outer wall surface of the screen member,
wherein at least one sidewall of the pair of sidewalls has a first straight section and a second straight section, the first straight section being at an angle to the second straight section.

19. The stirrer according to claim 1, wherein a pair of sidewalls of the slit extend between the inner wall surface of the screen member and the outer wall surface of the screen member, and
wherein each of the pair of sidewalls forms a different angle with respect to a radial direction of the rotor so that the slit is asymmetrical with respect to the radial direction of the rotor.

20. The stirrer according to claim 1, wherein a pair of sidewalls of the slit extend between the inner wall surface of the screen member and the outer wall surface of the screen member, and
wherein each of the pair of sidewalls forms a same angle with respect to a radial direction of the rotor so that the slit is symmetrical with respect to the radial direction of the rotor.

* * * * *